United States Patent
Schnell et al.

(10) Patent No.: US 9,213,313 B2
(45) Date of Patent: Dec. 15, 2015

(54) SYNTHETIC OPTICAL HOLOGRAPHY

(71) Applicants: Asociación Centro De Investigación Cooperativa en Nanociencias, CIC Nanogune, Donostia-San Sebastián (ES); The Board of Trustees of the University of Illinois, Urbana, IL (US)

(72) Inventors: Martin Schnell, Berlin (DE); Rainer Hillenbrand, Freidberg (DE); Paul Scott Carney, Champaign, IL (US)

(73) Assignees: Asociación Centre De Investigación Cooperativa en Nanociencias, CIC Nanogune, Donostia-San Sebastián (ES); The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 14/389,921

(22) PCT Filed: Mar. 12, 2013

(86) PCT No.: PCT/US2013/030411
§ 371 (c)(1),
(2) Date: Oct. 1, 2014

(87) PCT Pub. No.: WO2014/051680
PCT Pub. Date: Apr. 3, 2014

(65) Prior Publication Data
US 2015/0077819 A1    Mar. 19, 2015

Related U.S. Application Data

(60) Provisional application No. 61/705,296, filed on Sep. 25, 2012.

(51) Int. Cl.
G01B 9/021       (2006.01)
G03H 1/08        (2006.01)
(Continued)

(52) U.S. Cl.
CPC .................. *G03H 1/08* (2013.01); *G01B 9/021* (2013.01); *G03H 1/0443* (2013.01); *G03H 1/14* (2013.01);
(Continued)

(58) Field of Classification Search
CPC ........ G01B 9/021; G01B 9/023; G01B 9/025; G01B 9/027; G01B 9/029; G01B 9/04; G02B 21/0056; G03H 1/0443; G03H 1/08; G03H 1/10; G03H 1/14; G03H 2001/005; G03H 2001/0458; G03H 2001/2655; G03H 2222/36; G03H 2240/56
See application file for complete search history.

(56) References Cited

U.S. PATENT DOCUMENTS 3,640,598 A    2/1972    Neeley et al. .................. 350/3.5
3,760,344 A    9/1973    Hildebrand .................... 340/5 H
(Continued)

FOREIGN PATENT DOCUMENTS

JP    2002-526815    8/2002    ............... G03H 1/04
JP    2012-027996    2/2012    ............ G11B 7/0065
(Continued)

OTHER PUBLICATIONS

Chowdhury et al. "Structured oblique illumination microscopy for enhanced resolution imaging of non-fluorescent, coherently scattering samples," *Biomed. Opt. Exp.*, vol. 3, No. 8, pp. 1841-1854 (Jul. 2012).

(Continued)

*Primary Examiner* — Michael A Lyons
(74) *Attorney, Agent, or Firm* — Sunstein Kann Murphy & Timbers LLP

(57) ABSTRACT

Methods and apparatus for imaging a phase or amplitude that characterizes a scattered field emanating from a physical medium. A local probe is stepped to a plurality of successive probe positions and illuminated with an illuminating beam, while a specified phase function is imposed on a reference beam relative to the illuminating beam. A field associated with the scattered field is superimposed with the reference beam and the detection of both yields a detected signal which is recorded as a function of probe position in order to obtain a hologram. The holograph is transformed, filtered, and retransformed to generate an image. Alternatively, the illuminating beam may directly illuminate successive positions of the physical medium.

58 Claims, 21 Drawing Sheets

(51) Int. Cl.
*G03H 1/14* (2006.01)
*G03H 1/00* (2006.01)
*G03H 1/04* (2006.01)
*G03H 1/26* (2006.01)

(52) U.S. Cl.
CPC .. *G03H 2001/005* (2013.01); *G03H 2001/0458* (2013.01); *G03H 2001/2655* (2013.01); *G03H 2222/36* (2013.01); *G03H 2240/56* (2013.01)

(56) References Cited

U.S. PATENT DOCUMENTS

| | | | |
|---|---|---|---|
| 3,856,986 A | 12/1974 | Macovski | 178/6.5 |
| 3,889,226 A | 6/1975 | Hildebrand | 340/5 H |
| 6,262,818 B1 | 7/2001 | Cuche et al. | 359/9 |
| 8,659,810 B2 * | 2/2014 | Joo | 359/29 |
| 2006/0078113 A1 * | 4/2006 | Javidi et al. | 380/210 |
| 2007/0024866 A1 * | 2/2007 | Nisper et al. | 356/511 |
| 2010/0253762 A1 | 10/2010 | Cheong et al. | 348/31 |
| 2011/0261154 A1 * | 10/2011 | Chang | 348/40 |
| 2012/0026856 A1 | 2/2012 | Shimada et al. | 369/103 |
| 2012/0182591 A1 * | 7/2012 | Masumura | 359/11 |

FOREIGN PATENT DOCUMENTS

| | | | |
|---|---|---|---|
| KR | 10-2011-0098241 | 9/2011 | G01B 9/021 |
| WO | WO 99/12079 | 3/1999 | G03H 1/16 |

OTHER PUBLICATIONS

Dong Yun Lee, Examiner Korean Intellectual Property Office, International Search Report—Application No. PCT/US2013/030411, date of mailing Dec. 26, 2013, including The Written Opinion of the International Searching Authority (12 pages).

* cited by examiner

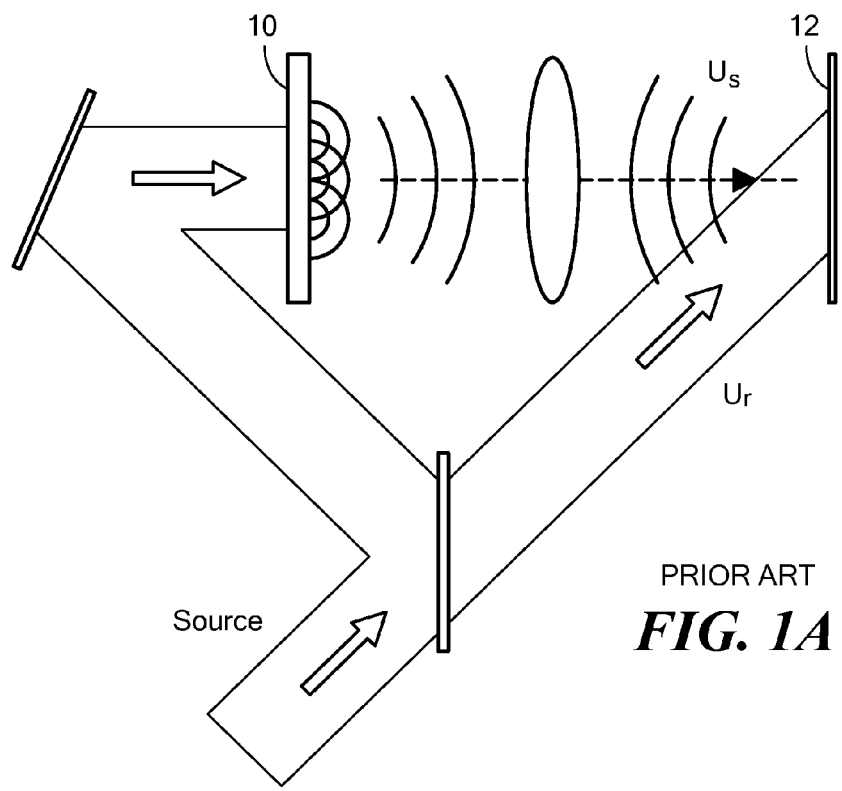
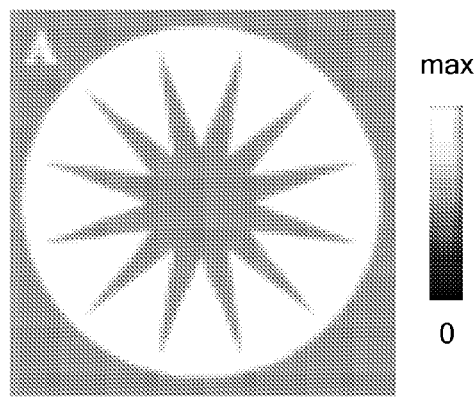
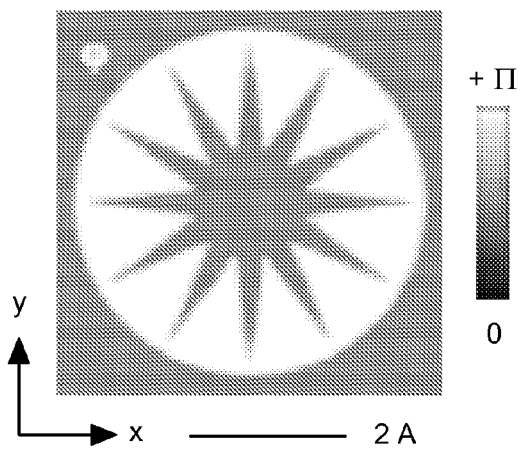
PRIOR ART
FIG. 1A
FIG. 1B
FIG. 1C

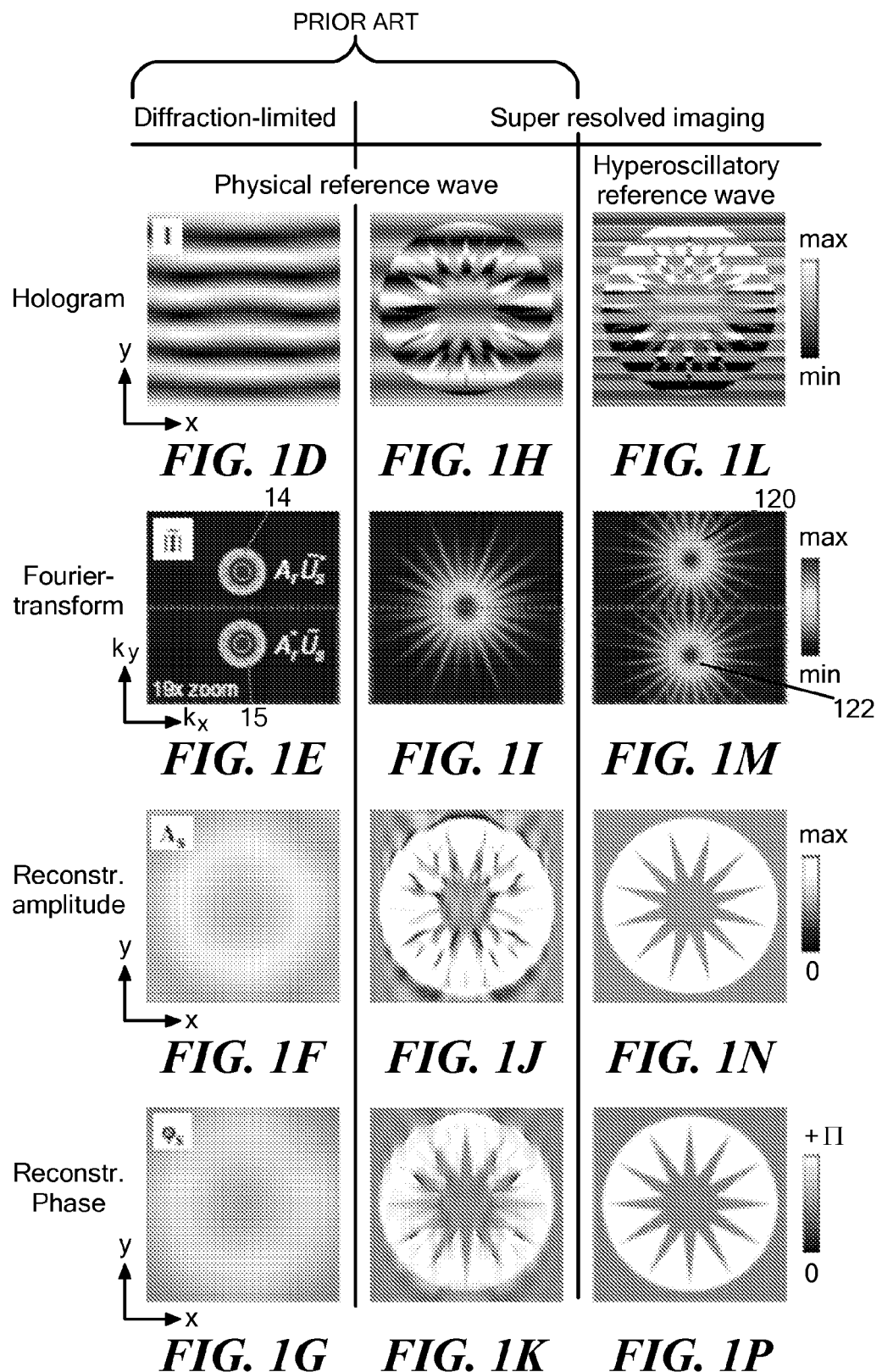

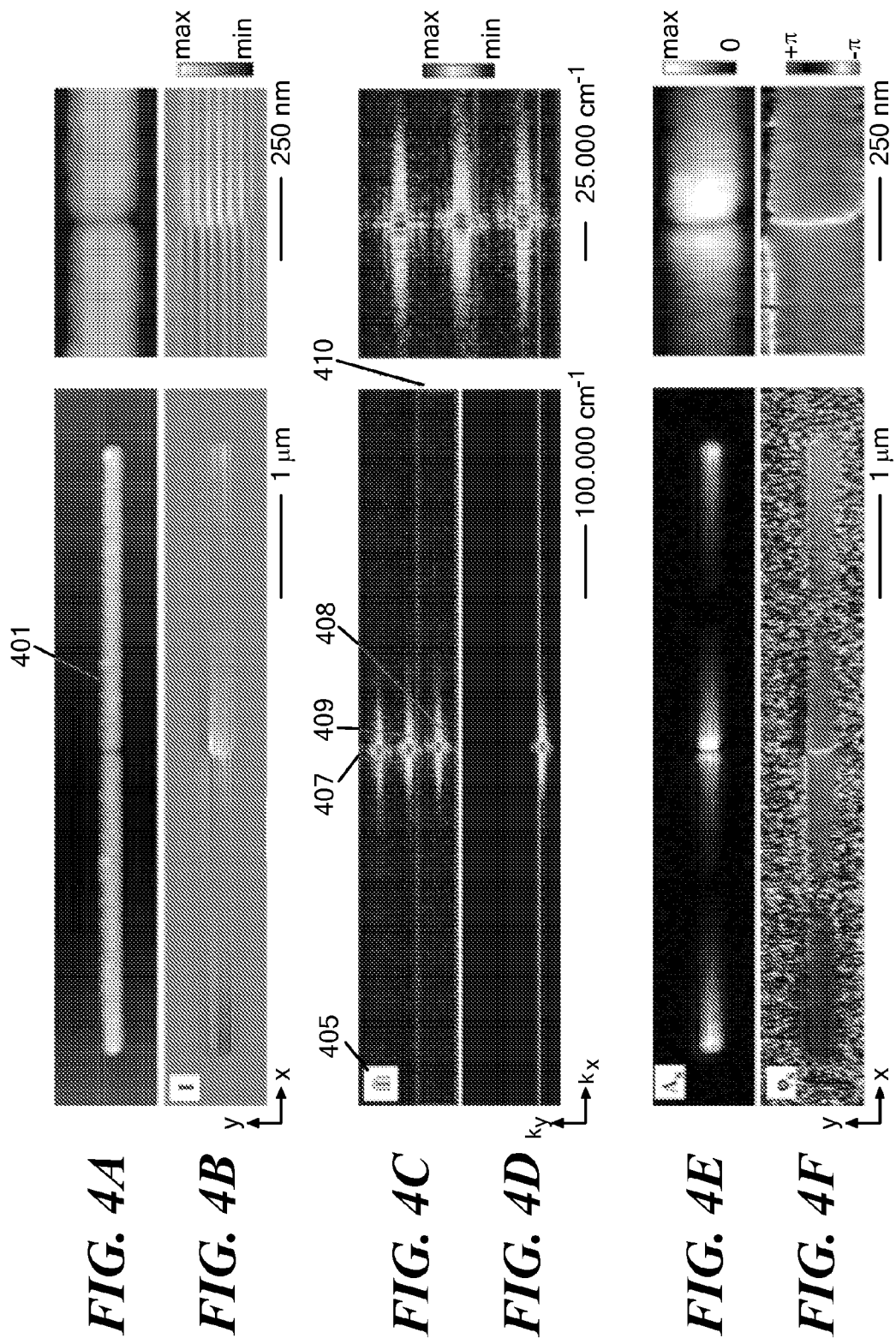

SYNTHETIC OPTICAL HOLOGRAPHY

The present application claims the priority of U.S. Provisional Patent Application Ser. No. 61/705,296, filed Sep. 25, 2012, and incorporated herein by reference. It may be referred to herein as the "'296 Provisional."

The work leading to this invention has received funding from the European Research Council under the European Union's Seventh Framework Programme (FP7/2007-2013)/ERC grant agreement no 258461-TERATOMO.

TECHNICAL FIELD

The present invention relates to methods for obtaining both amplitude and phase information in imaging a specimen, and, more particularly, to holographic imaging with a synthetic reference wave, enabling various advantages such as efficient subwavelength holography.

BACKGROUND ART

Holography has found a place in various domains of technology where waves scattered from an object are used to image the object. Holography is a form of coherent imaging in which the phase of a scattered wave conveys information about the scattering object, and it does so by interference between a wave scattered by the object and a wave that is either derived from the same source used to illuminate the object or bears a known (typically fixed) phase relationship to the illuminating wave.

Examples of coherent imaging are known in acoustics, in radar, as well as in optical holography. Interference of a scattered wave with the illuminating wave itself gives rise to fringes in the place of a detector, while an example of post-detection interference of a detected scattered wave with a non-radiated signal derived from the illuminating source is U.S. Pat. No. 6,825,674 (to Smith). The phase relation between the illuminating source and the signal used as a phase reference may be fixed, or may be modulated, as in U.S. Pat. No. 3,856,986 (to Macovski), for example, and the source, reference, or detector may be spatially swept, as in U.S. Pat. No. 3,889,226 (to Hildebrand), or U.S. Pat. No. 3,640,598 (to Neeley), for example. Processing of synthetic aperture radar (SAR) data with a coherent optical processor (where processing is performed in the visible portion of the electromagnetic spectrum) is termed a 'quasi-holographic' system, and may be used to yield reconstructed radar images, as described by Pasmurov et al., *Radar Imaging and Holography*, (The Institution of Engineering and Technology, London, 2009, hereinafter, Pasmurov)), which is incorporated herein by reference.

In all of the foregoing applications, the illuminating beam is diffracted from an aperture defined by the source of illuminating radiation and impinges upon the scattering object with a wavefront characterized by a finite radius of curvature. Moreover, in all of the foregoing applications, illumination of the scattering object is either monochromatic or quasi-monochromatic, which is the say that the range of wavelengths impinging on the scattering object is contiguous in frequency, and is narrow in comparison with the central wavelength, where "narrow" typically connotes a bandwidth-to-wavelength ratio of less than 5%.

In the various fields of optical microscopy, including, for example, optical scanning microscopy, or confocal microscopy (with additional modalities discussed below), the phase of light scattered by, or transmitted through, a specimen may carry important information. However, under ordinary circumstances, phase information is lost in the recording process because optical detectors record only the squared amplitude of the field and not the phase. While it is possible to determine the phase interferometrically at each pixel of the image separately, this requires the direct or indirect acquisition of multiple data points at each pixel, as is obvious from simple information-theoretic considerations, since amplitude and phase components must be distinguished. That is, at the least, the reference field must be varied to obtain data at three delays to as to determine the amplitude of the unknown field, the phase of the unknown field and the amplitude of the reference. In practice, noise in the measurements makes this minimalistic scheme unstable and many data must be obtained to perform a stable, nonlinear fit to a sinusoid. This typically requires the acquisition of tens to a few hundred data point distributed over a cycle of the interferogram. The result of this requirement is an acquisition time multiplied by a large factor, and substantially increased apparatus complexity.

As an alternative to point-by-point interferometry, holography records the optical amplitude and phase over an entire image by introduction of a reference wave. The interference between the optical field and the reference wave creates a specific interference pattern that encodes the optical amplitude and phase. The fact that the whole field is recorded gives rise to the illusion of a three-dimensional scene, the aspect of holography best known in popular culture.

Methods of optical scanning microscopy, in particular, have had tremendous impact in almost all fields of science and technology, especially in biology. While optical phase measurements provide an added level of insight, they have come at the cost of increased complexity, longer measurement times, and smaller images. In wide-field methods, holographic measurements are fast and relatively easy. The power of holography is that it encodes the amplitude and phase of the optical field at the measurement plane over the entire image and generally does not require the acquisition of any more data than are acquired in the nonholographic version of the same modality. Holography has proven difficult to implement in far-field scanning methods and is seemingly impossible in near-field and super-resolved imaging for reasons now described in detail.

A generic, prior art holography apparatus is shown in FIG. 1A in which a field $U_s(r)$, scattered by a complex object 10 (the amplitude and phase of which are represented in FIGS. 1B and 1C, respectively), is imaged onto a detector plane 12 and superimposed with a known reference field, $U_r(r)$ yielding an image-plane hologram, $I(r)$, where r is a vector denoting spatial position. Holographic techniques are described generally by Hariharan, *Basics of Holography*, §1.6, (Cambridge UP, 2002), hereinafter, "Hariharan (2002)," which is incorporated herein by reference. The intensity at the detector plane is given by $$I(r)=|U_r(r)|^2+|U_s(r)|^2+U_s^*(r)U_r(r)+U_r^*(r)U_s(r). \quad (1)$$

In the case that the reference field is a plane wave and in the plane of detection is of the form $U_r=A_r e^{i k_\parallel \cdot r}$, where $A_r$ is the amplitude of the reference field and $k_\parallel$ is the component of the reference wavevector k parallel to the detector plane, the amplitude and phase of the field may be determined by Fourier transform (FT) of the hologram. The FT of Eq. (1) is given by $$\tilde{I}(q)=|A_r|^2\delta(q)+C(q)+A_r\widetilde{U_s}^*(k_\parallel+q)+A_r^*\widetilde{U_s}(k_\parallel+q), \quad (2)$$

where the tilde indicates FT with respect to position, δ is the Dirac delta function, and C is the autocorrelation of $\widetilde{U_s}$. Of the four terms, the first term is a constant, proportional to the square of the reference amplitude, and may be subtracted or ignored. The second, autocorrelation, term is the square of the scattered field and is typically considered negligible with respect to the other terms and may be made so by increasing the amplitude of the reference field. The so-called direct term, $A_r * \widetilde{U}_s$, and conjugate term, $A_r \widetilde{U}_s^*$, proportional, respectively, to the scattered field and its conjugate, are shifted by $-k_\parallel$ and $k_\parallel$, i.e., they are shifted by $2|k_\parallel|$ in the FT plane. (The conjugate of a complex quantity has an imaginary component of equal magnitude and opposite sign.)

In the case that the scattered field is spatially bandlimited to the Ewald circle of reflection (as discussed in Born & Wolf, *Principles of Optics*, (Cambridge UP, $7^{th}$ ed., 1999), see pp. 699-703), the direct and conjugate images do not overlap and may be obtained separately by simply filtering the Fourier transform with a filter matched to the spatial bandwidth of the field and centered at $q=-k_\parallel$. More precisely, assuming $U_s$ is band limited and that $D(q)=1$ for q in the support of $\widetilde{U}_s$ (where $\widetilde{U}_s$ is non-zero) and $D(q)=0$ otherwise, then, if $D(k_\parallel+q)D(k_\parallel-q)=0$, and assuming the autocorrelation term is negligible, $\widetilde{U}_s(k_\parallel+q)=AD(k_\parallel+q)\tilde{I}(q)/|A|^2$. Either direct or conjugate image, once filtered, may be referred to herein as an "isolated crossterm." Thus, off-axis holography provides a means to determine the complex field, both phase and amplitude, from a single image so long as the field is band-limited.

In far-field holography (where fields emanating from a point are effectively spherical waves, i.e., where points of constant phase lie on a sphere), the physics of wave propagation guarantees that the scattered field is spatially bandlimited to the Ewald circle of reflection, which is to say that the support of $\widetilde{U}_s$ is contained within a circle of radius $2\pi/\lambda$. The component of the wavevector of the reference wave in the detector plane may likewise be as large as $2\pi/\lambda$. Thus, the direct and conjugate terms may always be determined separately by off-axis holography with sufficiently oblique illumination.

FIG. 1D is a calculated hologram derived using the diffraction-limited optical setup of FIG. 1A, while, in the FT of FIG. 1D shown in FIG. 1E, the direct 14 and conjugate 15 terms have separated into the upper and lower halves of the FT plane and do not appreciably overlap because $k_\parallel$ is of a magnitude larger than the spatial bandwidth (the width of the Fourier distribution of the field). In a diffraction-limited imaging system, the reference wavevector may always be made sufficiently large (to separate the direct and conjugate terms) by oblique incidence of the reference wave, as taught by Leith et al., *Reconstructed Wavefronts and Communication Theory*, J. Opt. Soc. Am., vol. 52, pp. 1123-30 (1962), incorporated herein by reference. By applying a window, indicated by the dashed box in FIG. 1E, and then shifting the result by $k_\parallel$ back to the center of the FT plane and taking the inverse FT, the original field amplitude (FIG. 1F) and phase (FIG. 1G) may be obtained, scaled by the reference conjugate amplitude $A_r^*$. A corresponding technique, taught in Pasmurov (2009), at p. 39, may be implemented for synthetic radar imaging.

As has long been known, the physics of waves (the fact that propagating fields are spatially bandlimited) imposes limits on resolution in standard far-field imaging systems, and these resolution limits are indeed manifested in the low-resolution reconstruction of the phase and amplitude in FIGS. 1F and 1G. In order to image at scales significantly smaller than the wavelength, a number of superresolution techniques have been developed, such as those described by Keilmann (2004), and others. In order to image at scales significantly below the wavelength of light used, it is necessary probe the nonpropagating, superoscillatory evanescent fields generated at sources and scatterers with high spatial frequency components. These evanescent waves decay exponentially away from the source, so it is necessary to interact with these fields close to the sample. This is the basic idea in scanning near-field optical microscopy (SNOM). A particularly successful variant of SNOM is the scattering-type SNOM (s-SNOM). s-SNOM is described, for example, by Keilmann et al., *Near-Field Microscopy by Elastic Light Scattering from a Tip*, Phil. Trans. R. Soc. Lond. A, vol. 362, pp. 787-805 (2004), which is incorporated herein by reference. A sharp local probe is placed near or at the surface of a sample, very often an atomic force microscope (AFM) probe. The probe-sample system is illuminated from the far-field. The local probe produces a strong local field and acts to couple out the local scattered fields, thus probing the high spatial-frequency near-field. The probe is scanned over the surface of the sample and the scattered field intensity is recorded as a function of tip position. The resolution in s-SNOM is effectively independent of wavelength and depends only on the tip sharpness.

However, a marriage of holographic phase imaging and superresolved imaging has remained seemingly impossible because of the fundamental issue illustrated in FIGS. 1H-1K, where the situation is simulated in which the diffraction-limited imaging system of FIG. 1A has been replaced by an unspecified superresolved imaging system with a resolution of $\lambda/100$, where $\lambda$ is the wavelength. The reference wave $U_r(r)$ remains the same as used in FIG. 1D-1G, such that the interference fringes (in FIG. 1H) are necessarily much larger than the smallest features of the sample (shown in FIG. 1B) that are being imaged. As a result, the direct and conjugate terms overlap as shown in the FT in FIG. 1I, and the reconstruction of both the amplitude (FIG. 1J) and phase (FIG. 1K) of the field suffers from serious artifacts.

In order to separate the direct and conjugate terms, a much larger reference wavevector would be needed. A superresolved imagining system working at a wavelength of 10 microns with 10-nm resolution would require a $k_\parallel$ of size three orders of magnitude greater than the free-space wavenumber. No practicable mechanism exists to physically generate such a reference field. Superoscillatory reference waves with $k_\parallel$ a few times larger than the free-space wavenumber have been tried (as by Bozhevolnyi et al., *Near-field Optical Holography*, Phys. Rev. Lett., vol. 77, pp. 3351-54 (1996), incorporated herein by reference). However, superoscillatory reference waves that are only several times larger than the free-space wavenumber of the imaging beam do not suffice, and at least two coregistered, nondegenerate holograms are needed in order to independently determine phase and amplitude, as shown by Carney et al., *A computational lens for the near-field*, Phys. Rev. Lett., vol. 92, 163903 (2004), incorporated herein by reference. Indeed, confocal scanning holography, as described by Jacquemin et al., *A low-error reconstruction method for confocal holography to determine 3-dimensional properties*, Ultramicroscopy, vol. 117, pp. 24-30 (2012) has proven elusive.

To enable phase imaging with a single, superresolved hologram, reference fields with wavevectors hundreds, or even thousands, of times the size of the free-space wavenumber, are required. Such fields will be referred to herein as "hyperoscillatory waves." In order to achieve true supperresolution holography, it would thus be desirable to provide an effectively hyperoscillatory reference wave.

SUMMARY OF EMBODIMENTS OF THE INVENTION

In accordance with embodiments of the present invention, a method is provided for imaging at least one of a phase and an amplitude characterizing a scattered field that emanates from a sample. The method has steps of:
a. sequentially scanning a parameter characterizing the sample to a plurality of successive loci of a hologram dimension;
b. illuminating the sample with a focusing illuminating beam;
c. imposing a specified phase function on a reference beam relative to the illuminating beam;
d. superimposing with the reference beam a field associated with the scattered field;
e. detecting the superimposed reference beam and field associated with the scattered field for each locus to produce a detected signal;
f. recording the detected signal as a function of locus in order to obtain a hologram; and
g. processing the hologram to generate an image of at least one of phase and amplitude associated with the scattered field.

In accordance with another embodiment of the present invention, the step of processing the hologram to generate an image may include:
i. transforming the hologram into a transform space;
ii. filtering the transform to isolate a single crossterm; and
iii. retransforming the single crossterm to generate an image of at least one of phase and amplitude associated with the scattered field.

In alternate embodiments of the present invention, sequentially scanning a parameter may include sequentially scanning a position in physical space. The illuminating beam may include a beam of photons, such as in at least one of the infrared, terahertz, visible, ultraviolet, and x-ray portions of the electromagnetic spectrum. Sequentially scanning the position may include scanning a probe position relative to the sample.

In further embodiments of the invention, sequentially scanning the position may include stepping an illuminating beam to a plurality of positions at successive fields of view, each field of view encompassing a portion of the sample. At least one of the illuminating beam and the reference beam may be quasi-monochromatic. A plurality of illuminating or reference beams may be distinguished in the step of detecting. Superimposing the reference beam and field associated with the scattered field may include superimposing a plurality of reference beams that traverse distinct reference paths.

In other embodiments of the invention, the single crossterm may be one of a direct term and a conjugate term in a Fourier transform of the holograms. The scattered field may be characterized by a wavelength substantially equal to a wavelength characterizing the illuminating beam. The scattered field may be characterized by a wavelength that is distinct from any wavelength characterizing the illuminating beam, and, at least one of the illuminating and reference beams is one of the group including a beam of photons, plasmons, phonons, surface waves, surface polaritons and massive particles. At least one of the illuminating and reference beams may propagate in free space or may be a guided wave.

In yet other embodiments of the present invention, sequentially stepping the local probe to a plurality of successive probe positions may include motion of a nanoparticle within the medium. At least one of the illuminating beam and the reference beam may include a plurality of wavelengths, which may, or may not, be distinct. A frequency characterizing the illuminating beam may be scanned.

In further embodiments of the invention, the probe may be a local probe, or, more specifically, a near-field probe. Sequentially scanning a parameter may include sequentially scanning at least one physical parameter, such as voltage, temperature or magnetic field, applied to a portion of the sample. It may also include monitoring a dynamic process or movement on the sample. Additionally, the superimposed reference beam and field associated with the scattered field may be wavelength-resolved for each locus to produce a plurality of detector signals, and the steps of recording the detected signal and processing the hologram to generate an image may be applied to each of the plurality of detector signals. Wavelength-resolving may be performed by means of a grating. Alternatively, the superimposed reference beam and field associated with the scattered field for each locus may be demultiplexed to produce a plurality of wavelength-resolved detector signals.

In yet other embodiments of the invention, stepping the local probe to a plurality of successive probe positions may include motion of a nanoparticle within a medium, where the motion may be induced by at least one of an electric field, a magnetic field, and optical tweezers.

Sequentially stepping a local probe to a plurality of successive probe positions may include stepping the local probe to a plurality of successive probe positions in three dimensions, and stepping in a third dimension is accomplished by vibration of the local tip at a fundamental frequency. The detector signals may be simultaneously demodulated at harmonics of the fundamental frequency.

Sequentially stepping the illuminating beam to a plurality of successive fields of view may include scanning confocal microscopy and may include stepping the illuminating beam to a plurality of successive fields of view in three dimensions. Imposing a specified phase function on a reference beam relative to the illuminating beam includes modulating a phase characterizing the reference beam. In particular, the reference field phase may be modulated by reflection from a movable mirror.

In accordance with further embodiments of the invention, the reference beam may be generated from the illuminating beam by partial reflection at a beamsplitter chosen from the group of a dielectric surface, a thin metal film, and a profiled mirror. The scattered field may be collected with a light-concentrating element, and detecting the superimposed reference beam and field associated with the scattered field may include detection by means of a photodetector. Imposing a specified phase function on a reference beam relative to the illuminating beam includes incrementing a phase characterizing the reference beam as a linear function of time, and may also include wrapping the phase modulo $2\pi$.

In accordance with other embodiments of the present invention, a reference beam phase function may be imposed in such a manner as to position crossterms associated with distinct frequencies in specified positions in the transform space. Imposing a specified phase function on the reference beam relative to the illuminating beam may include nonlinear reference phase functions. Imposing a specified phase function on the reference beam relative to the sample beam may include feedback from topography of the physical medium, and may be tailored to identify defects in manufactured samples. There may also be successive imaging to provide dynamic imaging of a developing sample.

In accordance with another aspect of the present invention, an apparatus is provided for imaging at least one of a phase and an amplitude characterizing a scattered field emanating from a sample. The apparatus has a scanning mechanism for sequentially scanning a parameter characterizing the sample to a plurality of successive loci of a hologram dimension, a source for generating an illuminating beam, and a phase modulator for imposing a specified phase function on a reference beam relative to the illuminating beam. Additionally, the apparatus has a detector for detecting the reference beam and a field associated with the scattered field to generate a detector signal and a processor adapted for processing the hologram to generate an image of at least one of phase and amplitude associated with the scattered field.

In other embodiments of the invention, the scanning mechanism may be a scanning local probe or a scanning near-field probe, and the scanning local probe may be a cantilevered tip of an atomic force microscope. The phase modulator may be a translating mirror. The source may emit multiple discrete wavelengths, or may be swept in wavelength. A dispersive element may resolve wavelength components prior to detection, and a demultiplexer for separating components of the detector signal.

In accordance with another aspect of the present invention, a method is provided for recording a hologram, having steps of:

a. sequentially scanning a parameter characterizing the sample to a plurality of successive loci of a hologram dimension;

b. illuminating the sample with a focusing illuminating beam;

c. imposing a specified phase function on a reference beam relative to the illuminating beam;

d. superimposing with the reference beam a field associated with the scattered field;

e. detecting the superimposed reference beam and field associated with the scattered field for each locus to produce a detected signal; and f. recording the detected signal as a function of locus in order to obtain a hologram.

In another embodiment, the hologram may be rendered as a classical viewable hologram.

In another embodiment yet, and apparatus is provided for recording a hologram. The apparatus has a scanning mechanism for sequentially scanning a parameter characterizing the sample to a plurality of successive loci of a hologram dimension and a source for generating an illuminating beam. A phase modulator imposes a specified phase function on a reference beam relative to the illuminating beam, a detector detects the reference beam and a field associated with the scattered field to generate a detector signal. Finally, the apparatus has a processor adapted for recording the detected signal as a function of locus thereby generating a hologram.

BRIEF DESCRIPTION OF THE DRAWINGS

The foregoing features of the invention will be more readily understood by reference to the following detailed description, taken with reference to the accompanying drawings, in which:

FIGS. 1A-1K depict the layout and imaging consequences of prior art holography. FIG. 1A is a schematic of the components uses to image a sample whose amplitude and phase are represented in FIGS. 1B and 1C. FIGS. 1D-1G are simulations of a diffraction-limited hologram and its transform into Fourier space and back, while FIGS. 1H-1K are simulations of a superresolved hologram and its transform into Fourier space and back. FIGS. 1L-1N and IP are simulations of a hologram and its transform into Fourier space and back that may be achieved by application of a putative hyperoscillatory reference wave.

FIG. 4A shows the topography of an IR-gap antenna, and FIG. 4B shows an infrared hologram of the antenna. FIG. 4C shows a Fourier transform of the hologram of FIG. B, while FIG. 4D shows a Hamming-filtered version of the transform. Reconstructed infrared amplitude and phase images are shown in FIGS. 4E and 4F, respectively, revealing the infrared field distribution of this antenna structure, in accordance with an embodiment of the present invention.

FIG. 6D shows a nanoholographic apparatus with multiple reference arms, in accordance with embodiments of the present invention, while FIG. 6E depicts the separation of complex fields acquired thereby in the Fourier domain.

FIG. 11D shows the use of multiple piezoelectric stages for phase modulation in accordance with an embodiment of the present invention, while

DETAILED DESCRIPTION OF EMBODIMENTS OF THE INVENTION

Figure 2A:
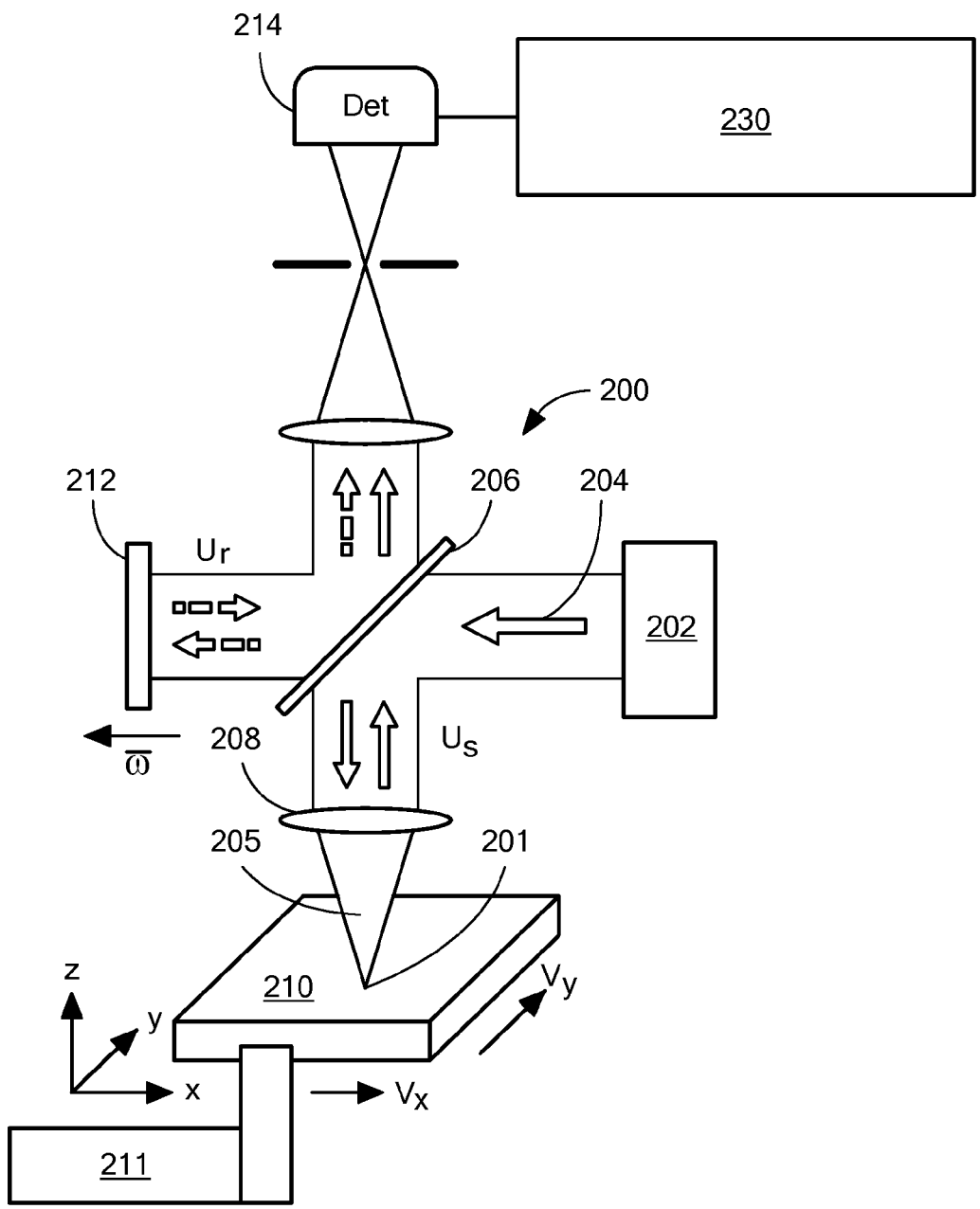
FIGS. 2A and 2B show two embodiments of the present invention, confocal and a scanned near-field optical microscopy modalities, respectively.

In accordance with embodiments of the present invention, the concept of a "synthetic reference wave" (SRW) is employed, corresponding to the "artificial reference field," as that term was used in the '296 Provisional application. Use of an SRW, as now described with respect to a variety of embodiments, allows circumvention of the usual physical limits, described above with reference to the prior art, in order to achieve novel holographic effects on scales both larger and smaller than the diffraction limit. Techniques in accordance with embodiments of the present invention may be referred to herein as Synthetic Optical Holography (SOH).

In an exemplary application of the present invention, detailed below, scattering-type scanning near-field optical microscopy (s-SNOM) is combined with synthetic reference wave holography to achieve nanoscale infrared images with unprecedented speed and simplicity. Specifically, embodiments of the present invention are described, a 2.25-megapixel image of nanowire arrays, acquired in less than an hour, will be shown as an example of how the present invention may be applied. Methods in accordance with the present invention may advantageously shift phase-resolved SNOM from the kilopixel range into the realm of digital cameras. They may also be advantageously applied to many kinds of scanning microscopy, for instance, confocal microscopy, structured illumination, STED, Raman and two-photon scanning microscopy. Where the scattered field is characterized by a frequency that is distinct from any frequency characterizing the illuminating beam, a reference beam is employed that is coherently converted to the frequency of the scattered field of interest.

DEFINITIONS

The term "image" shall refer to any multidimensional representation, whether in tangible or otherwise perceptible form, or otherwise, whereby a value of some characteristic (amplitude, phase, etc.) is associated with each of a plurality of locations corresponding to dimensional coordinates of an object in physical space, though not necessarily mapped one-to-one thereonto. Thus, for example, the graphic display of the spatial distribution of some field, either scalar or vectorial, such as field intensity or phase, for example, constitutes an image. So, also, does an array of numbers, such as a 3D holographic dataset, in a computer memory or holographic medium. Similarly, "imaging" refers to the rendering of a stated physical characteristic in terms of one or more images.

An image (in the generalized sense defined in the preceding paragraph) containing both phase and amplitude information associated with a scattered field may be referred to herein as a "hologram." It is to be understood that, for further analysis or display of data, not all of the information contained within a hologram must be used.

The terms "object," "sample," and "specimen" shall refer, interchangeably, to a tangible, non-transitory physical medium or object capable of being rendered as an image, whether in transmission or in scattering.

Where a field is incident upon a sample, the "incident field" shall refer to that field present in the absence of the sample, and the "scattered field" is defined to be the difference between the total field at the detector when the sample is present and the incident field. The difference between the total field measured in the vicinity of the sample or in the far field may arise due to elastic or inelastic processes, such as diffraction, scattering, fluorescence, stimulated emission or stimulated emission depletion, etc.

The word "probe," as used herein, and unless otherwise required by specific context of usage, shall encompass both any illuminating beam 205 (shown in FIG. 2A) and any application of a local tip 222 (as shown, for example, in FIG. 2B), illuminated by a sample beam 226, which as herein clarified, may have completely distinct application as a near-field probe or as any other form of local probe.

The field at the sample may be referred to as "the local field." In some instances, the local field may be reflected, transmitted, or scattered towards the detector, and, in other instances, the local field may be guided to a detector, via a tapered glass fiber, transmission line, or otherwise. In all cases, the field at the detector shall be referred to as "a field associated with the scattered field," whether the local field propagates to the detector via free space, or whether the field is guided to the detector.

In a wave function of the form $U_r[r(t)] = A_r(t) e^{-i \phi_r(t)}$ representing a field (such as an optical field, where r represents a spatial coordinate and t represents time, $A_r(t)$ may be referred to as an amplitude function, and $\phi_r(t)$ may be referred to as a phase function. All terms of physical optics are used herein in the sense typically imputed to them in the art, and reference may be made to Hariharan (2002), in case any term is unclear.

As used herein, and in any appended claims, "modulation" as referring to phase in the context of any sort of interferometric measurement is to be understood as applying either to a reference beam or to a signal beam, or to any combination of the two such that the relative phase between the reference and scattered waves incident upon a detector is varied.

It is to be noted that while tip 222 may serve for purposes both of a "local probe" and a "near field probe," these are utterly separate functional concepts and must, under no circumstances, ever be conflated. A "near field probe" is merely one form of a local probe, and both terms are now rigorously defined to avoid any misunderstanding:

A "local probe," as the term is used herein, shall be defined as a localization of the field used to probe the sample by any means. This includes, for example, a focus, associated with a focal point which is scanned. Such a focus may be formed by refractive, reflective, or diffractive elements. The local probe may also be formed by other means of field-localization such as the placement of an aperture in the near-zone of the sample. The local probe may generally interrogate a finite volume of the sample but is associated with a point that is scanned.

A "near field probe," as used herein, is a local probe that, additionally, consists of a material element which interacts with the sample through the field in the near zone of the sample, that is in the region where evanescent fields are appreciable. The near-field probe will usually consist of elements which are of high spatial-frequency, that is, it has features with a local radius of curvature smaller than the wavelength. The probe, like the local probe of which it is a special case, is associated with a point which is scanned. It may be made of any material, but is commonly metallic, or a semiconductor, or a dielectric. The common near-field probe is a sharp needle-like structure with a tip brought into close proximity or even touching the sample.

The verb "record," as used herein and in any appended claims, shall refer to reducing data to a format that is sufficiently fixed and non-transient as to be capable of being subsequently read by a person or machine. Thus, for example, fixing a detector signal in a memory stage of a processor shall constitute "recording" the phenomenon—say, field intensity—that is sensed by the detector.

Figure 2B:
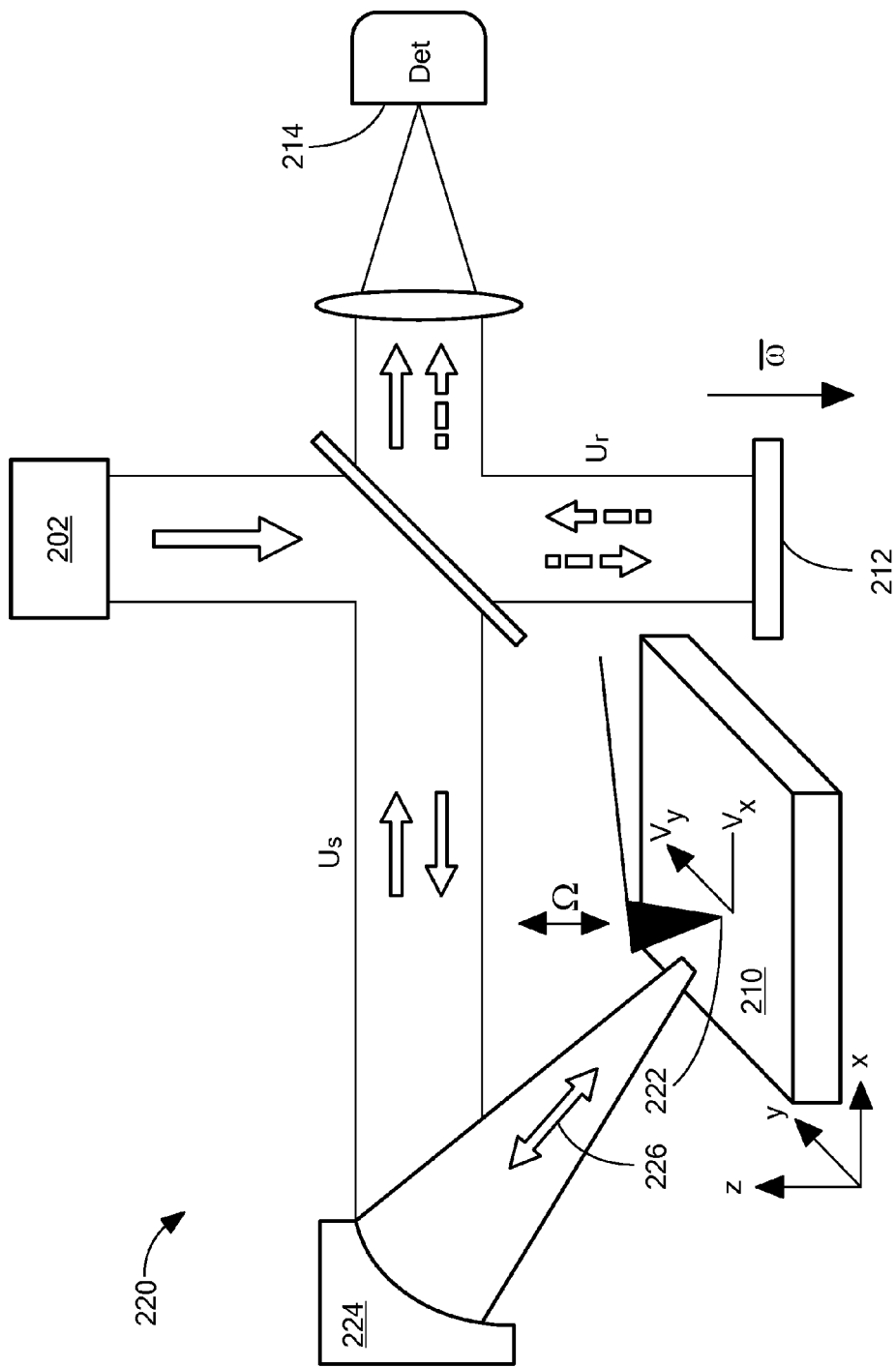

As used herein as a matter of notational convention, and as indicated in the apparatus FIGS. 2A and 2B, $\hat{z}$ shall designate the propagation axis where an illuminating beam is incident upon a sample, while $\hat{x}$ and $\hat{y}$ shall designate axes transverse to the propagation axis.

The term "white light position," referring to any interferometer, shall denote the point where the phase difference between light traversing both interferometer arms is zero for all wavelengths.

The adjective "arbitrary," and the adverb "arbitrarily," as applied to reference fields that may be generated in accordance with the present invention, are used in the sense of "unconstrained" or "unrestricted," and subject to specification by the designer or user of a system, rather than in a sense of randomness. It is to be understood, however, that the designer may specify random basis functions, for example, for purposes of compressive holography, as further described below, and randomness by design is not excluded from the scope of the present invention.

Examples of Sources

Reference will be made in the present description to a variety of types of illumination, of which several examples will now be presented, without limitation, and to which reference may then be made infra without further elucidation.

A source of electromagnetic radiation (also referred to herein as a "source," or as an "illuminating source") may be referred to as a "broadband source" when it is characterized by a bandwidth which exceeds the spectral resolution of the detection scheme, in the case of spectrally resolved measurements, or by a bandwidth which exceeds the frequency defined by the inverse of the longest delay introduced in the reference arm. Examples, provided without limitation, of sources characterized herein as broadband, include thermal radiation sources such as a glow bar, as conventionally employed in Fourier transform infrared (FTIR) spectroscopy, and plasma sources such as a current-induced high-temperature argon arc source, described by Bridges, et al., *Characterization of argon arc source in the infrared, Metrologia*, vol. 32, pp. 625-628 (1995), incorporated herein by reference. In another example, coherent broadband infrared light may be generated by a difference frequency generator (DFG), as described by Amarie et al., *Broadband-infrared assessment of phonon resonance in scattering-type near-field microscopy, Phys. Rev. B*, vol. 83, 045404, (2011), incorporated herein by reference. Synchrotron radiation in the x-ray spectrum provides a further example of broadband radiation.

Another class of sources useful in various embodiments of the present invention includes sources that emit multiple discrete wavelengths simultaneously, $\lambda_1, \lambda_2, \ldots, \lambda_N$. Examples of such sources, provided without limitation, include: frequency comb light sources, lasers emitting multiple-frequency radiation, gas discharge lamps, and emission from a broadband source filtered with a Fabry-Perot resonator.

Certain embodiments of the present invention may be practiced with purely monochromatic sources, such as quantum cascade lasers or gas lasers, for example, which continuously emit at the same single wavelength. In other embodiments, monochromatic frequency scanning sources may be employed, emitting radiation at only one single wavelength at a given time. The wavelength may be swept between two defined limits. The wavelength sweeping may be continuous, partially continuous or discrete, manual or automatic. For discrete sweeping, the wavelengths $\lambda_1, \lambda_2, \ldots, \lambda_N$ are sequentially emitted. Examples of monochromatic frequency scanning sources include quantum cascade lasers, gas lasers and other laser types using a motorized grating or rotating mirror to sweep the frequency.

"Metachromatic frequency scanning sources" emit radiation simultaneously at a number M of discrete wavelengths numbered $\lambda_1, \lambda_2, \ldots, \lambda_M$. Each individual wavelength $\lambda_m$ may be swept from wavelength $\lambda_{m,a}$ to wavelength $\lambda_{m,b}$. Sweeping may be discrete, partially continuous or continuous. Sweeping of the wavelength $\lambda_m$ may be independently from the weeping of other wavelengths, or, alternatively, all wavelengths $\lambda_m$ may be swept dependently. An example of emission falling within the rubric of a multichromatic frequency scanning source is emission from several monochromatic frequency scanning sources superimposed to form a single output beam, where each source may be swept independently.

FIGS. 1L-1P illustrate a simulation of superresolved imaging as would apply in a case where an hyperoscillatory reference field were to be available. The results of Fourier transforming a hologram obtained using the system of FIG. 1A have been combined with a reference field adequate to separate the field and its conjugate as in FIG. 1E. A simulated hologram obtained under these conditions is shown in FIG. 1L. The rate of phase variation of the reference field was chosen so that the phase cycles through $2\pi$ every 4 pixels in the y-direction. The reference wavevector is thus a quarter of the total bandwidth of the image and provides minimal overlap (in the Fourier-space transform shown in FIG. 1M) between the field and its conjugate. At the resolution simulated, this translates to an effective $k_\|$ that is 25 times the free-space wavenumber and that enables the unambiguous and superresolved reconstruction of both amplitude (FIG. 1N) and phase ((FIG. 1P) of the field, $U_s(r)$, by inverse Fourier transformation of the data marked by the dashed box in FIG. 1M.

Use of SRWs, defined above, is introduced herein as a new concept in holography, as applied to imaging systems that make use of serial data acquisition such as confocal microscopy (FIG. 2A) or scanning near-field optical microscopy (SNOM) (FIG. 2B), and additional embodiments developed in the course of the following description. In this new concept, rather than varying the reference field at each pixel, the reference field is varied across the image to encode the amplitude and phase of the scattered light. In the fashion of widefield holography, one may take advantage of the mutual information between the pixels. At each position $r_n$ of a scanning probe tip, or, in another embodiment of the invention, of an illuminating beam, the scattered field $U_s(r_n) = A_s(r_n) e^{i \phi_s(r_n)}$ is superposed at the detector with a reference field $U_R(r_n) = A_R(r_n) e^{i \phi_R(r_n)}$. The phase of the reference field $\phi_R(r) = 2\pi \cdot 2 \, d/\lambda$ may, for example, be controlled by the position d of a piezo-actuated reference mirror (as described in examples of apparatus FIGS. 2a and 2b). While the probing tip or illuminating beam is rapidly scanned over the sample, the reference mirror is slowly translated, yielding a single (quasi-constant) reference phase at each pixel. Recording the detector signal $I(r_n)$ pixel-by-pixel, one obtains a synthetic image-plane hologram of the sample according to Eq. (1). Eq. (1) is the generic expression of a synthetic hologram, where $U_s$ may be any field scattered or reflected in a scanning microscopy setup. It is identical to a wide-field hologram, from which amplitude and phase of $U_s$ may be recovered by standard reconstruction methods.

The synthetic reference wave (SRW), introduced in accordance with the present invention, solves the fundamental problem of generating hyperoscillatory reference fields, and it also provides a means for readily implementing novel holographic schemes in a number of serial coherent imaging modalities. In a regular holography experiment, the entire image is acquired in one moment and the reference field must satisfy the reduced wave equation, $$\nabla^2 U + \left(\frac{\omega}{c}\right)^2 U = 0$$

(where ω is the optical frequency and c is the velocity of light), limiting the available fields. However, in a serial data acquisition system such as scanning microscopy, the data at each point are acquired also at different moments in time. The reference field may be adjusted arbitrarily (in the sense defined above) between measurements so as to achieve any desired spatial dependence.

More explicitly, the intensity, I(r), that is scattered from a scanning probe tip, or, in another embodiment of the invention, that is either reflected from, as shown in FIG. 2B, or transmitted through, the sample in a confocal microscopy setup, is acquired point by point at points $r_n$ sequentially in time so that $r_n = r(t_n)$. The reference field, whose phase and amplitude may, in principle, both be controlled independently of the rest of the experiment, also may be taken to be a function of time $U_r[r(t)] = A_r(t) e^{-i \Phi_r(t)}$. The reference field, $U_r[r(t_n)]$, is not constrained in any way by the values of the reference field at other times (and, hence, positions) $U_r[r(t_m)]$ in the way that a physical reference wave is constrained by the wave equation. Moreover, within the scope of the present invention, the reference is not limited to constituting a plane wave in the far field, and may, indeed, be a wave supported in a waveguide, such as a fiber or photonic crystal, or may also be a propagating surface mode, such as a plasmon on a metal surface.

Examples of apparatus in which embodiments of the present invention may advantageously be implemented are now described with reference to FIGS. 2A and 2B. FIG. 2A depicts salient features of a confocal microscopy system, designated generally by numeral 200. A quasi-monochromatic source 202, preferably a single-mode laser in the embodiment shown, emits one or more substantially coherent beams 204 of light. (The term "quasi-monochromatic" shall be employed as defined in Born & Wolf (1999), at p. 295.) Beam 204 may be characterized by a wavelength λ, or by a plurality of wavelengths, such as a comb of wavelengths generated when source 202 operates in a mode-locked modality, for example. It is to be understood that the present invention is described in terms of light solely as a heuristic convenience, and without limitation. Within the scope of the present invention, the interrogating beam may also be a beam of electromagnetic waves of any energy, or an acoustic beam, or a beam of massive particles, as long as a mechanism exists for controlling the phase of the reference beam.

A source 202 that is pulsed, or that is swept in frequency, is also within the scope of the present invention. Alternatively, a scanning near-field optical microscope 220 (described infra, with reference to FIG. 2B) may also be swept in frequency, within the scope of the present invention. In cases where the frequency of source 202 is swept, time-resolved detection allows for deriving a hologram as a function of wavelength, allowing for far-field spectroscopic imaging, as with quantum cascade lasers in the infrared, for example. Insofar as three-dimensional amplitude and phase imaging is described below, chemical mapping in three dimensions is thus advantageously enabled by virtue of the present invention.

Beam 204 is split in a Michelson (or other) interferometric configuration, by means of beamsplitter 206, for example. Of course, it is to be understood that FIG. 2A is only one example of the many configurations that may be practiced within the scope of the present invention. A portion of beam 204, denoted sample beam 226 (or, equivalently, illuminating beam 205) impinges onto a sample 210, via illumination optics such as focusing lens 208 such that, where the beam impinges upon the sample, the beam is at, or approaching, a physical focus, thereby concentrating the power in the beam at the sample or at a portion thereof. Sample 210 may be any sort of physical medium characterized by an extent in the x̂-ŷ plane, transverse to the axis of incidence of the sample beam $U_s$. Sample 210 may also be referred to herein, interchangeably, as a "physical medium," or as a "specimen." Sample beam 226 moves sequentially to successive fields of view, designated generally by numeral 201, relative to sample 210, and it is to be understood that it is relative motion between axis ẑ of sample beam 226 and sample 210 that is important, and either (or both) may be moved, by means of an actuator 211 (shown solely by way of example) within the lab frame, within the context of the present invention. (Note, in some contexts, numeral 210 may designate, particularly, the sample surface upon which illuminating beam 205 impinges, as required by context.)

A second portion of beam 204 is used to form reference beam $U_r$, the phase of which may be modified by phase modulator 212 (depicted as a translating mirror, by way of example, although any means, such as a spatial light modulator (SLM), etc., is within the scope of the present invention). Alternative methods for generating the reference beam $U_r$, include the use of a separate source that emits coherently with source 202 at either the same frequency or at a different frequency. In this case, a further method for controlling the phase of the reference beam $U_r$, is made available by detuning the emission frequency of the second source with respect to the frequency that is to be detected in the scattered field $U_s$.

As a reminder, it is to be noted that, as used herein, and in any appended claims, "modulation" as referring to phase in the context of any sort of interferometric measurement is to be understood as applying either to a reference beam or to a signal beam, or to any combination of the two such that the relative phase between the reference and scattered waves incident upon a detector is varied. A variety of modulation techniques encompassed within the scope of the present invention are described below.

The configurations shown in FIGS. 2A and 2B are presented solely as examples, but are not intended to be limiting in any way. The reference arm may be folded in order to amplify the effect on total phase of displacements of a mirror, etc., all within the scope of the present invention. Reference beam $U_r$, directed via beam splitter 206, onto photodetector (or other appropriate) detector 214 (otherwise referred to herein as a "detector"), having been varied in phase as a function of the position of sample 210 being imaged, may be referred to as the artificial reference field. The term photodetector shall denote any device that generates an electrical signal related to the number (or flux) of photons impinging upon the detector, and is thus sensitive to the square of the amplitude of the incident field.

When the field $U_s$ scattered from the sample, or a field with a field scattered from the sample, in the sense defined above, is superimposed with one or more reference beams $U_r$ at detector 214, a detector signal derived from detector 214 is processed by processor 230 such that an interferogram is recorded and subsequently processed as described in detail hereinafter. Processor 230 may be referred to interchangeably herein as a controller. The combination of components used to form an interferogram may be referred to collectively herein as an interferometer, designated generally by numeral 216 (shown in FIG. 2D).

Confocal microscopy is a particularly advantageous embodiment of the present invention because the scanning may be performed in three dimensions. The added dimensionality makes even more space available in the Fourier domain for the multiplexing of signals, as discussed in further detail below.

An alternative embodiment of the present invention is a scanning near-field optical microscopy (SNOM) apparatus, designated generally by numeral 220 in FIG. 2B. Sub-optical-wavelength-dimensioned local tip 222 (also referred to herein as a "probe tip," "scanning tip," "near-field probe," "local probe," or "tip," but see the cautionary note in the following paragraph!) is scanned across sample 210, probing the surface with evanescent waves, with signal beam 226 and scattered field $U_s$ coupled in the far field via coupling mirror 224.

It is to be noted that while tip 222 may serve for purposes both of a "local probe" and a "near field probe," these are utterly separate functional concepts and must, under no circumstances, ever be conflated. A "near field probe" is merely one form of a local probe, and both terms have been rigorously defined in the Definition section above, which definitions are to apply under all circumstances.

Scanning tip 222 may be the cantilevered tip of an atomic force microscope (AFM), for example. As in the case of FIG. 2A, phase modulator 212, depicted, for example, as a moving mirror, generates $U_r$ as the artificial reference field.

In a particular exemplary embodiment, an illumination scheme may be employed, where the illuminating beam is s-polarized, i.e., parallel to the long axis of an object being imaged (a nanoantenna in Example I below), and perpendicular to the probing tip 222, in order to ensure an efficient excitation of the imaged object and to avoid a direct excitation of the tip 222. As is well known in the field of SNOM, any contribution to detected signal from the field scattered from the sample, or from any the macroscopic parts of the instrument (i.e., everything that is not the sharp end of the probe) needs to be removed as background. Background contributions may be suppressed in a variety of ways, and the scope of the present invention is not limited by the particular modality employed. The remaining near-field signal arises from the interaction of the end of tip with the sample where a highly localized field is generated and it is this signal that is desired for purposes of near-field imaging. This part of the signal is strongly dependent on the height of the tip above the sample.

It is typical in SNOM that the signal is obtained by tapping the tip 222 and locking in that tapping or recording harmonics of that tapping. This processing of the signal is referred to herein as "demodulation." It is the common practice because it separates the signal for the so-called background. In nano-holography, the background is in the low-frequency part of the hologram and so demodulation is not typically necessary. It is possible to directly record the detector signal, reconstruct holograms and apply a method to remove the background in the images. For example, a linear function or any other function from the approach curve may be subtracted to remove the background, and thus demodulation is not the only method to do this. Thus, as should be made abundantly clear, demodulation is not necessary for holographic SNOM, indeed, this may be a particular advantage of SOH in some cases.

Merely by way of example, and, in no way suggesting that these techniques are required to be practiced in accordance with the practice of the present invention, it is noted that in some methods (pseudoheterodyne), tip 222 taps the surface 210 and background signal is rejected in the signal acquired by demodulation of higher harmonics of the tapping frequency $\Omega$. (But, the reader is reminded that demodulation need not be performed, in accordance with practice of the invention.) For example, tip 222 may oscillate at a frequency, say, in the sub-MHz range, for example (tapping-mode AFM), and by subsequent demodulation of the detector signal at $3\Omega$. It is to be understood that particular examples of SNOM modalities are provided by way of example only, and not by way of limitation of the scope of the present invention.

Indeed, in accordance with novel methods in accordance with the present invention, higher harmonic demodulation for background suppression is not necessary at all, insofar as filtering may be achieved in the spatial Fourier transform, or by a host of other means currently known in the art or yet to be invented, all of which are encompassed within the scope of the present claims.

Volume Scanning with a Near-Field Tip

In accordance with embodiments of the present invention, the near-field probe (whether a cantilever AFM tip, or any other nanoprobe, moved by any means) may move in a volume above the physical medium being imaged, but the invention does not require that it be so moved. Other techniques of volume scanning are discussed below, with reference to FIGS. 7A and 7B. More particularly, in accordance with the present invention, probe 222 (shown in FIG. 2B), used, in this embodiment, as a near-field probe, need not be moved periodically in a dimension transverse to the surface ("tapping mode") in order to reject background signal, since background may be removed by filtration in the Fourier space, or by any method that a practitioner, in exercising design choice, elects to employ. Indeed, slow tip deflection modes such as peak force, and contact modes may be practiced to derive amplitude and phase data in accordance with the present invention, however they are not required to be practiced, and are only mentioned by way of example.

Accordingly, the SRW of the present invention is introduced with any chosen spatial dependence, by controlling the reference field as a function of time. Included in the possible reference fields is the hyperoscillatory plane wave needed in a superresolved hologram, a nanohologram. A linear-in-time phase function is particularly attractive when matched to a constant scanning rate. Such a phase function is given by $\phi_r(t) = \varpi t + \phi_0$. The FT of the data is as in Eq. (2), and exhibits an effective $k_\parallel$ determined by $\varpi$. Explicitly, data are obtained at positions in the image plane, $r(t) = (x, y, z_0) = (v_x t, v_y t, z_0)$, where $v_x$ and $v_y$ are rates at which the sampled region is moving in respective directions in the frame of reference of the sample. The phase of the reference may thus be rewritten as a function of position, $\phi_r(r) = k_\parallel \cdot r + \phi_0$, where $k_x = \varpi/v_x$, and $k_y = \varpi/v_y$. By a combination of making $\varpi$ sufficiently large and $v_x$ or $v_y$ sufficiently small, a hyperoscillatory SRW is created, that is, $|k_\parallel| \gg 2\pi/\lambda$.

Suppose that the tip 222 is scanned along the principal directions of a Cartesian system, moving rapidly in the x direction such that $x = v_x t$ and that after traveling the total scan length X, it returns at the same speed and moves one step, $\Delta_y$, in the y direction. The effective velocity in the y direction is then $v_y = v_x \Delta_y/(2X)$. The phase of the reference may this be rewritten as a function of position, $\phi(r) = k_\parallel \cdot r + \phi_0$, where $k_x = \varpi/v_x$, and $k_y = \varpi/v_y = 2\mathit{X}_x/\Delta_y = 2X\varpi/(v_x \Delta_y)$. The effective $k_\parallel$ may thus be seen to be controlled by the rate of change of the phase in the reference arm, the length of the fast scanning axis, the speed of scanning, or the step size along the slow axis. Real systems require a finite turn-around time, T. This may be taken into account by modifying the effective slow-axis scanning speed, $v_y = \Delta y[(2X/v_x) + T]^{-1}$. The effective $k_\parallel$ may be made as large as desired, making accessible the hyperoscillatory fields needed in super-resolved imaging and near-field phase-resolved imaging, nanoholography.

Spectrally-Resolved Synthetic Optical Holography

A series of embodiments of the present invention are now described, wherein data are collected explicitly as a function of frequency. This may be accomplished by using a spectrometer (designated generally by numeral 245 in FIG. 2C) in place of an integrating detector. It may also be accomplished by using a swept source and making time-resolved measurements during the course of sweeping the frequency of the source. In either case, a wealth of embodiments are enabled in accordance with the present invention, as now described, initially, with reference to FIG. 2C.

Figure 2C:
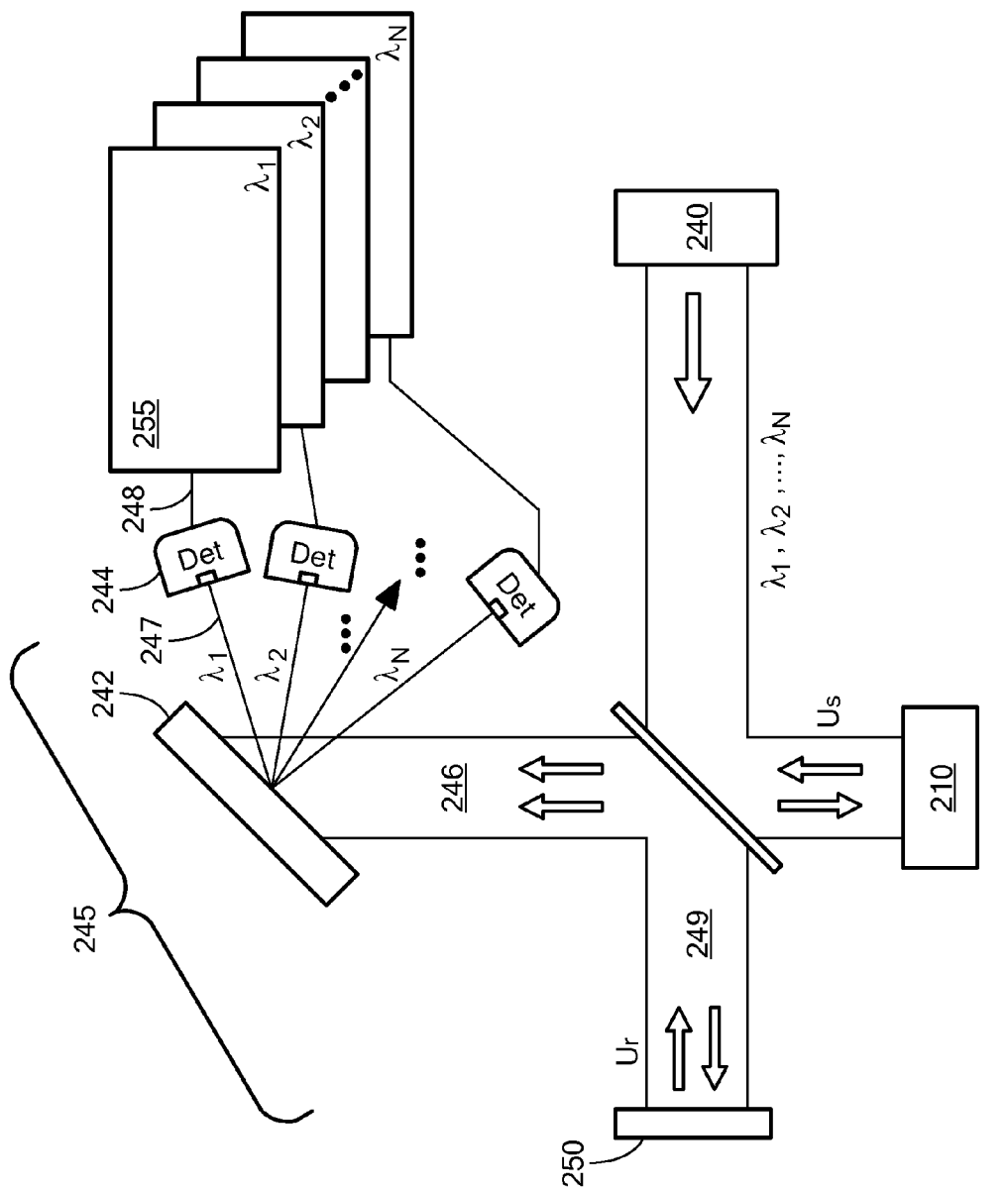
FIG. 2C schematically depicts an embodiment of the present invention in which spectral components are analyzed in parallel.

Illumination source 240, in the embodiment of FIG. 2C, is a source emitting a plurality of wavelengths $\lambda_1, \lambda_2, \ldots, \lambda_n, \ldots \lambda_N$. A SOH method is performed, as described with reference to either of the foregoing FIGS. 2A and 2B, and with the flowchart described below with reference to FIG. 3. In distinction to the methods described above, however, a dispersive element 242, such as a grating, for example, is disposed before one or more detectors 244 to spectrally analyze the combined field 246 consisting of the reference beam and the scattered field. Dispersive element 242 splits the wavelengths $\lambda_1, \lambda_2, \ldots \lambda_n, \ldots \lambda_N$ into several monochromatic beams 247. In accordance with other embodiments of the invention, dispersive element 242 may include a prism, or any other dispersive element.

Detection is performed by an array of one-pixel detectors 244. Each detector (designated by an index #n) detects the beam related to a corresponding wavelength $\lambda_n$. Recording the $n^{th}$ detected signal 248 as a function of probe position is performed in order to obtain the corresponding $n^{th}$ hologram 255. The recording of all detector signals #1 to #N is performed simultaneously, thus a stack of N holograms is recorded. Each hologram pertains solely a single corresponding wavelength $\lambda_n$. Processing of each hologram 255 proceeds as described for the SOH method as generally described herein with respect to a single-wavelength source.

In accordance with other embodiments of the invention, the number of detectors 244 may be greater or fewer than the number N of discrete wavelengths $\lambda_i$ emitted by source 240, although use of fewer detectors results in a loss of information. In accordance with yet another embodiment, source 240 may be a continuum source, with individual detectors 244 detecting a portion of the spectrum dispersed by dispersive element 242.

Spectrally-Resolved Synthetic Optical Holography—Multiple Reference Arms

With a single reference arm 249, governed, for example, by motion of reference mirror 212 (which may be a piezo-mirror, for example), the phase modulation of the reference beam acts on all wavelengths emitted by source 240. Using multiple reference arms, phase modulation on only part of all wavelengths is enabled. A reference field derived from a single multi-frequency source may be divided into independent reference arms either by means of a dispersive element such as a prism or grating, or fields may be derived from multiple sources which independently provide input to the reference arms and are combined to form a single illuminating field used to interrogate the sample. Separate modulation of the relative phase of the reference for distinct wavelengths allows a better separation between the direct and conjugate terms for the case that the individual wavelengths $\lambda_n$ cover a large spectral band, as when the multi-wavelength source spans an octave or more, for example ($\lambda_N:\lambda_1 > 2$).

Instead of emitting a plurality of wavelengths, as described above, source 240 may include a broadband source, in another embodiment of the invention. In that case, each one-pixel detector 244 detects a wavelength band $[\lambda_{n-1}, \lambda_{n+}\Delta]$. Thus, the $n^{th}$ hologram #n contains amplitude and phase information on the scattered field that is spectrally integrated from $\lambda_{n-}\Delta$ to $\lambda_{n+}\Delta$.

Spectral-Resolved SOH with Swept Sources and a One-Pixel Detector

Figure 2D:
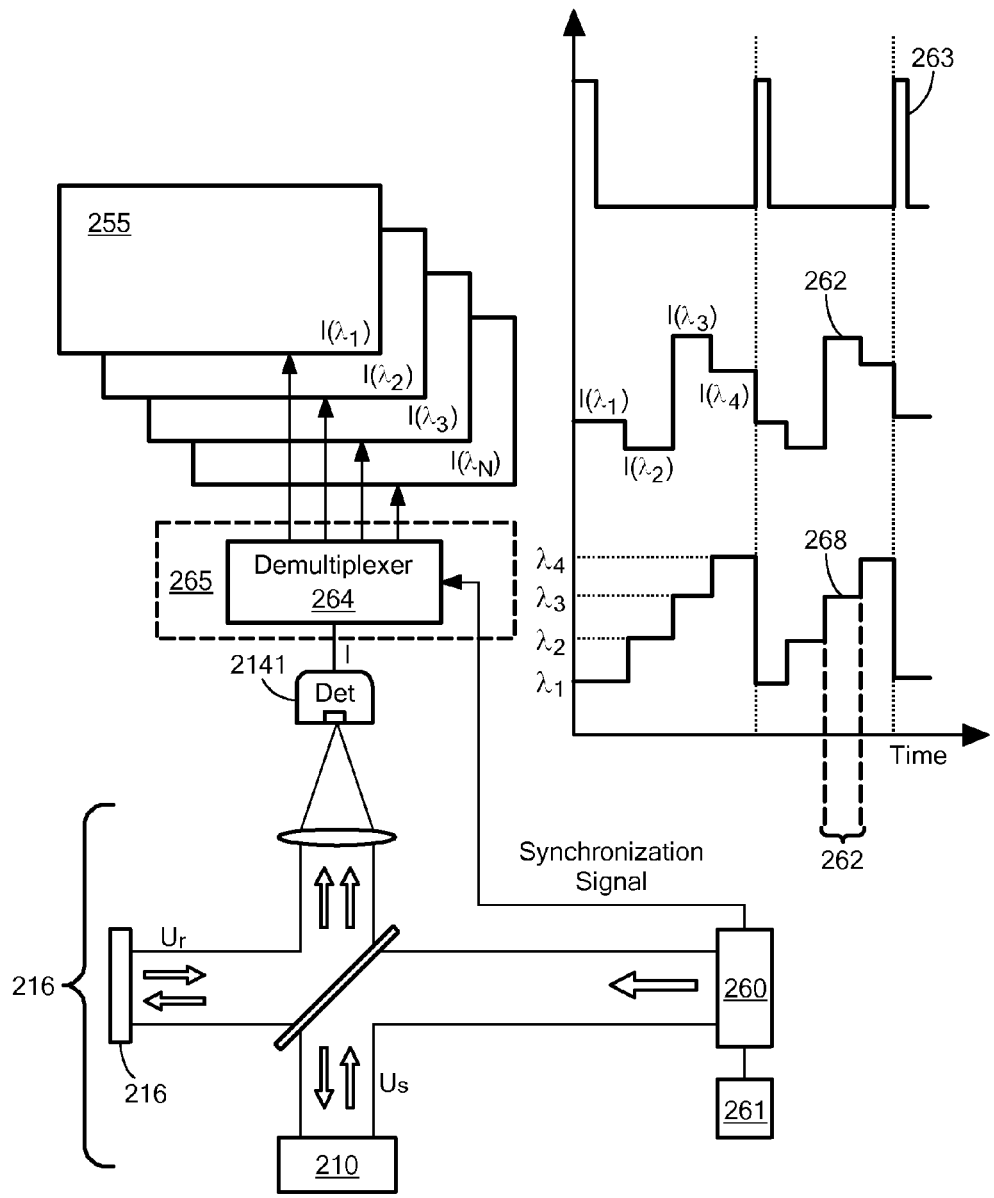
FIG. 2D depicts an embodiment of the present invention in which spectral components are analyzed serially.

A further embodiment of the invention is now described with reference to FIG. 2D. Illumination source 260 is a monochromatic frequency scanning source. The SOH method is performed, as described herein with reference to FIGS. 2A, 2B, and 3, as if a single-wavelength source were to be used. The method depicted in FIG. 2D is distinct, however, in that source 260 is swept discretely, thus emitting sequentially at wavelengths $\lambda_1, \lambda_2, \ldots, \lambda_n, \ldots \lambda_N$, as plotted by trace 268 as a function of time. The detection is performed with a single-pixel detector 2141.

The local probe 222 (shown in FIG. 2B) or illuminating beam 205 (shown in FIG. 2A) is moved to a position on sample 210 in synchrony with synchronization signal 261 and one frequency sweep of the source 260 is executed. During the source sweep, reference mirror 212 (or any equivalent reference-beam-phase-modulating modality) is fixed. The detector signal 262 is recorded during the source sweep. A demultiplexer 264 applied to detector signal 262 yields the detector signal $I_n$ at wavelength $\lambda_n$. The detector signal $I_n$ is stored in the $n^{th}$ hologram 255. After the source sweep is completed, the local probe 222 or illuminating beam 205 moves to the next position on sample 210 and also the reference mirror 212 moves to the next position.

The foregoing procedure yields a stack of holograms, #1 to #N, where each hologram 255 contains only a single wavelength $\lambda_n$. Processing of each hologram 255 is performed by the SOH method, as described herein, assuming a single-wavelength source.

It is to be understood that while trace 268 of source wavelength as a function of time, shows time segments 262 of emission by source 260 at each wavelength to be substantially equal in duration, embodiments in which wavelength segments are sampled for unequal durations of time are also within the scope of the present invention. Additionally, the reference phase, governing, for example, by an offset in the position of mirror 212, may be changed during the course of a frequency sweep of source 260.

Source 260, or a controller 261 associated therewith, may send a synchronization signal 263 when a new sweep is started. A further synchronization signal (not shown) may be sent, as well, at each wavelength switch from $\lambda_n$ to $\lambda_{n+1}$. These synchronization signals 263 may be used by the device that records the detector signal (SOH controller 265) to achieve the demultiplexing of the detector signal. The functionality of a demultiplexer is designated by numeral 264, although it is understood that demultiplexing may be performed by controller 265. The synchronization signal may be of either electrical or optical format (such as a TTL signal via cable or optical cable) or, it may involve a change of the source emission (e.g., blanking or attenuation of the source emission during a short time). Synchronization signals are not required, however, in order to implement the methods described with reference to FIG. 2D.

In accordance with other embodiments, a synchronization signal 263 may also be issued by the SOH controller, telling the source 260 to (a) start a new sweep, or to (b) switch the wavelength of emission from $\lambda_n$ to $\lambda_{n+1}$.

Spectrally-Resolved SOH with Swept Multichromatic Source and Multiple Detectors

In accordance with other embodiments, a synchronization signal 263 may also be In accordance with a further embodiment of the invention, parallel multiplexing techniques described with reference to FIG. 2C may be combined with serial multiplexing techniques that have been described with reference to FIG. 2D. Spectrally sweeping This method yields N holograms 268 where the wavelengths λ1,n to λM,n are encoded in a single hologram, #n. Processing the N holograms yields a total of N×M amplitude and phase images. Variant embodiments employing multiple reference arms, as described with reference to FIG. 6D, for example, are all within the scope of the present invention as claimed.

Additionally, the combination of "Spectral-resolved SOH with swept sources and a one-pixel detector" with "Spectroscopic detection using an array of one-pixel detectors" is also possible within the scope of the present invention. In this case, N×M holograms are recorded, each hologram #(m,n) containing only the single wavelength λm,n.

Reference Measurements

For each emitted wavelength $\lambda_n$, the intensity of emission by source 260 (referred to herein as a "reference measurement") may be recorded in parallel with transcription into digital memory of the corresponding hologram 268, as common in instrumentation. This may be accomplished by adding a further detector (not shown) to the setup, or with the same detector 214 used for recording the hologram data. In the latter case, a multiplex approach may be employed for mixing the hologram data with the reference measurement data, thus allowing for demultiplexing after the detector signal has been recorded. Additionally, the instantaneous wavelength of the source emission may be determined independently by an appropriate measurement. For example, this can be accomplished by recording an interferogram of the source emission, either with the interferometer 216 used for recording the hologram or with an additional interferometer setup. For example, the wavelength may be determined with a spectrometer.

If the local probe 222 (shown in FIG. 2B) is vibrated or stepped in height, as, for example in SNOM, a reference measurement may be obtained by comparing different harmonics of the detector signal. The recording of multiple demodulated harmonics is described below with reference to FIG. 7. In SNOM, for example, the desired signal is contained in higher-harmonics nΩ with n>1, while harmonics 0Ω and 1Ω mostly contain the background signal. In some circumstances, the latter may be assumed to be spectrally independent and thus serve as a reference for the desired signal at frequency nΩ, with n>1.

Furthermore, if the local probe 222 is vibrated or stepped in height, as, for example, in SNOM, a reference measurement may be obtained by comparing the detector signal at the different heights of the local probe.

The reference measurements, as heretofore described, may be used for correcting errors of source 210 in tuning to the same wavelength $\lambda_n$ with the same emission intensity in repeated measurements, as in repeated sweeps at different locations on sample 210 of local probe 222 or illuminating beam 205.

Arbitrary SRW

Figure 2E:
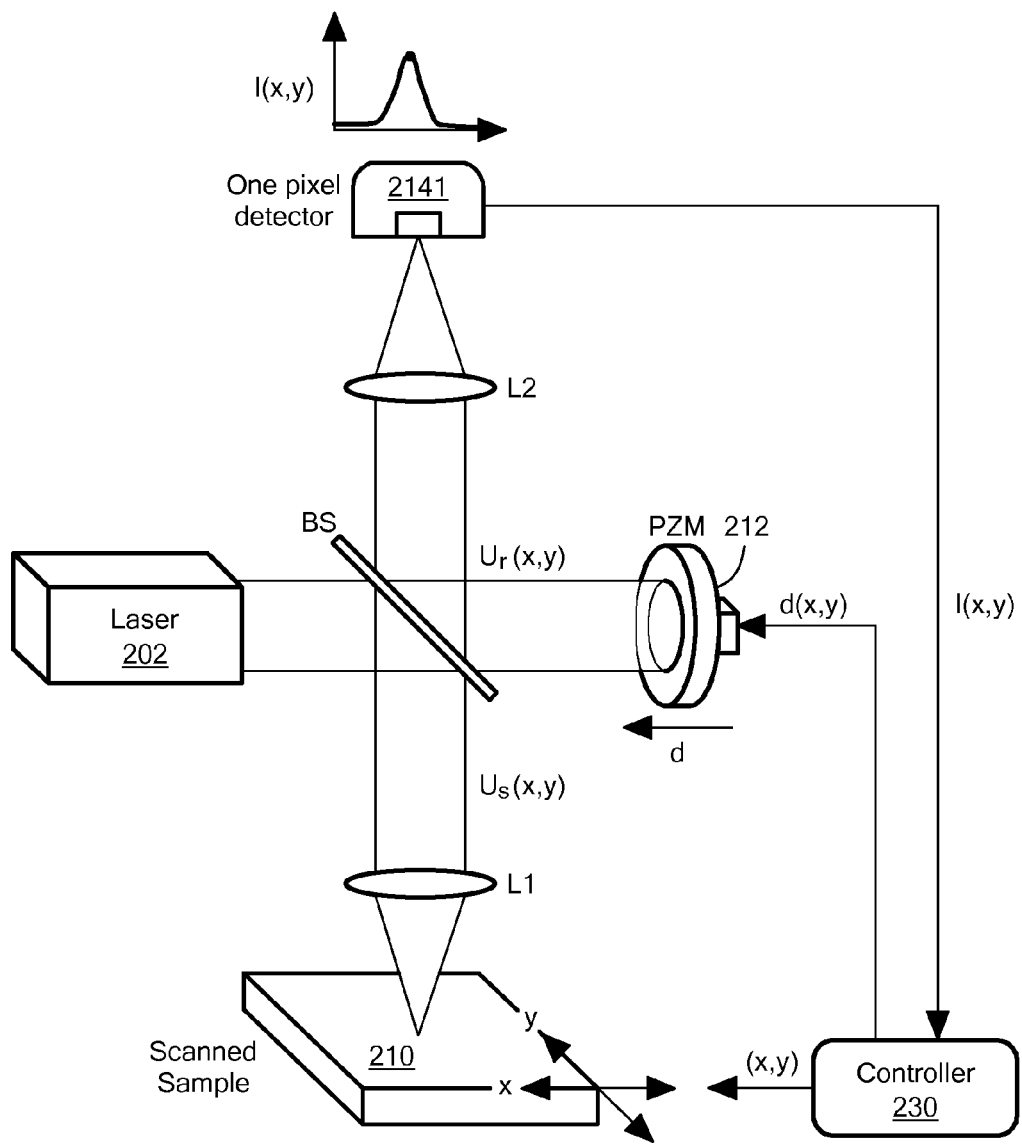
FIG. 2E depicts an exemplary embodiment of the present invention implementing an arbitrary synthetic reference wave.

Whereas discussion herein of the phase function $\phi_r(t)$ as a function of time t largely considers a linear ramp as a function of time, it is to be understood that such consideration is only by way of example and for heuristic convenience. In point of fact, various functions of time may be advantageous under different circumstances. One specific way to implement a phase function is to describe it as a function of the (x,y) position of the local probe, i.e., $\phi_r(x,y)$. In case a piezo-actuated reference mirror 212 is used, for example, this can be accomplished as shown in FIG. 2E. When controller 230 updates the (x,y) position of the local probe 222 or illuminating beam 205, the reference mirror 212 is moved to a position d=d(x, y) which is stored in an SRW matrix or lookup table. It is to be understood that this method of governing the phase and a modality of imposing a phase as a function of time are equivalent for purposes of the present invention.

Generalization to Q+1 Dimensions

In any of the modalities (such as spectroscopic dispersion of a broadband source after recombination of sample and reference beams, or temporal sweeping of monochromatic or polychromatic sources) discussed above with reference to FIGS. 2C and 2D, the data are equivalent, and similar approaches may be applied to processing data. For example, if holography is performed in Q spatial dimensions, acquired data may be considered as simply a (Q+1)-dimensional hologram, where the raw data are acquired in a space-frequency domain.

If variations with frequency of the detected field are not too rapid (according to the criterion laid out below), at each pixel a Fourier transform (FT) of the acquired data yields a time-domain response in which the direct and conjugate images may be identified and determined by filtering: a form of one-dimension holography. The single-point case is described below. On the other hand, if variations of the field as a function of frequency are so rapid that the FT is not sufficiently "time-limited", the cross-information across pixels made be taken advantage of That is, by Q+1 dimensional FT, the data may be transformed to the spatial-frequency/time domain. The usual shift in the spatial frequency domain due to the phase ramp in the reference arm can be used, together with the separation on the time axis, to sufficiently separate the direct and conjugate terms. Thus, analysis of the acquired data may be performed simply as a Q+1 dimensional generalization of the Q-dimensional case.

In the case, moreover, where spatial variations in the axes 1, 2, . . . , Q are so rapid that the FT is not sufficiently "time-limited", but the spectral variations in frequencies (Q+1 axis) are not too rapid, then a Q+1 dimensional generalization can be applied and a sufficient separation of the direct and conjugate terms may be achieved.

For example, in the typical case of stepping in (x,y) directions, the stack of 2D holograms may be merged to a 3D data volume. Processing of the data then is applied to the 3D data volume, rather than to the 2D holograms individually. This transfers the individual 2D SRWs to a single 3D SRW. A separation of the direct and conjugate term is possible when the variations in at least one axis are not too rapid.

Examples of particular embodiments of the invention employing spectrally resolved modalities as described above with reference to FIGS. 2C and 2D may include one or more of the following refinements:

In accordance with one embodiment, scattered field $U_s$ may be associated with tip 222 acting as a near-field probe, as defined above. By keeping reference mirror 212 at a fixed position during the acquisition of the stack of holograms, the reference phase is constant across each hologram. Modulation of the reference phase is provided by placing the reference mirror at a distance d≠0 from the white light position of the interferometer. The white light position is the point, where the phase difference of both interferometer arms is zero for all wavelengths. The reference phase is then a function of the wavelength λ according to $\phi=4\pi d/\lambda$, where normal incidence on the reference mirror is assumed as an example.

Discretization and Phase Wrapping

Returning now to a general discussion of methods in accordance with all forms of SOH discussed herein, the effects of spatial discretization (i.e., discretization of r) should be carefully considered. As the probe is scanned over the sample, the field is measured at time intervals $\Delta_t$, leading to a spatial-sample spacing, $\Delta_x$. Since the length X of x̂ travel is generally expected to be much larger than $\Delta_y$, $k_y$, will usually be large compared to $k_x$. Suppose that $k_y \Delta_y = n2\pi$, where n is an integer. Clearly, integer multiples of $2\pi$ in the phase have no physical consequence. Thus $k_y$ may be replaced with $\bar{k}_y = \text{mod}_{2\pi/\Delta_y}(k_y)$. Of course, this same argument applies to $k_x$, but it may be often (but not always) assumed that $\Omega$ is typically chosen so that $k_x \Delta_x < 2\pi$. The detector plane reference wavevector may be replaced with $\bar{k}_\| = (\bar{k}_x, \bar{k}_y, 0)$.

Optimal Sampling and Phase Ramp

Given a fixed number of pixels along the direction of the phase ramp and assuming the autocorrelation term is negligible, the shift, $\bar{k}_\|$, should be a quarter of the bandwidth in order to maximize separation of the direct and conjugate images while avoiding aliasing. This implies that the phase should complete a $2\pi$ cycle every 4 pixels. Given such a $\bar{k}_\|$, the spatial sampling rate of the image is preferably chosen so that the bandwidth of the image (that is, the full-width at half-maximum (FWHM)) is no more than half the total bandwidth available. Regardless of the actual spatial bandwidth of the sample, the effective tip radius $\rho$ sets a best-possible resolution and hence limits the bandwidth of the acquired image to $2\pi/\rho$. By acquiring data at a spatial sampling rate of half the tip radius or finer, the hologram is guaranteed to provide enough bandwidth to separate the direct and conjugate images with an optimum effective $\bar{k}_\|$. In cases where the sample itself is spatially band-limited below the limits imposed by the finite size of the tip, the sampling requirement may be relaxed, as may the magnitude of $\bar{k}_\|$.

In cases where, for whatever reason, the autocorrelation term cannot be made insignificant by increasing the amplitude of the reference, filtering may be applied in order to reduce or eliminate the autocorrelation term. An increase in both the sampling rate and $\bar{k}_\|$ provides as large a separation of the desired (direct image) signal from the autocorrelation as may be indicated.

Advantages of the Present Invention with Respect to the Synchronization Requirement Phase-resolved SNOM, whether phase-shifting, or pseudo heterodyne, requires that the motion of the mirror be synchronized with the motion of the probe. This then greatly increases cost and complexity. The phase is determined at each pixel individually, this has meant that phase-resolved near-field imaging has, to-date, been slower than amplitude-only SNOM and atomic force microscopy, and therefore provides smaller images than the AFM on which it is based. Because only one datum needs to be acquired at each pixel and no synchronization is require between the probe and the reference arm, data may be acquired very fast using nanoholography, in principle as fast as AFM.

Figure 3:
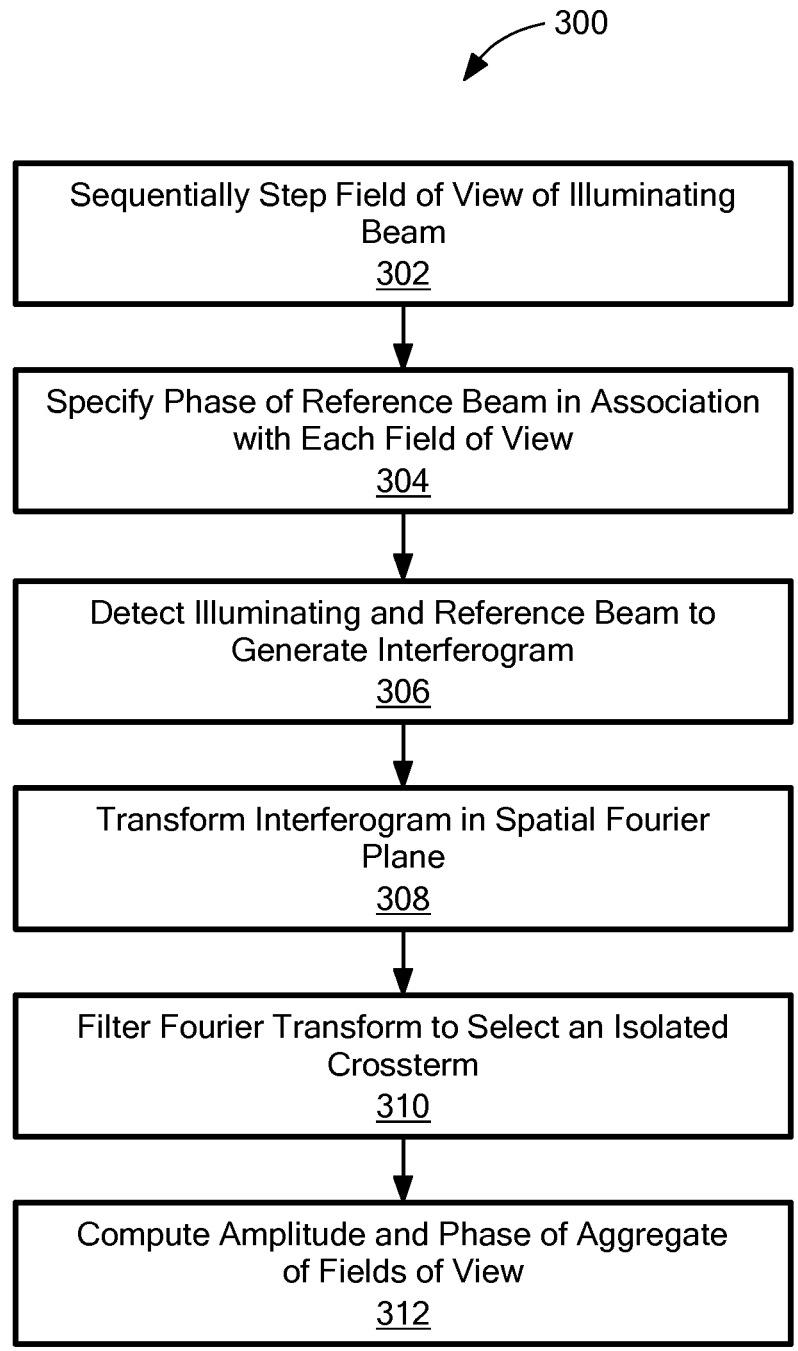
FIG. 3 shows a basic flowchart with steps in accordance with an embodiment of the present invention.

Steps in accordance with methods of the present invention are depicted, by way of example, in flowchart 300 of FIG. 3. A field of view of one or more quasi-monochromatic beams is sequentially stepped (302) in a transverse plane with respect to propagation axis of the illuminating beams. A specified phase is associated (304) with an artificial reference field for each field of view. The illuminating and reference beams are combined and detected (306) to generate an interferogram, which is then transformed (308) into a transform plane, and filtered (310) to isolate a crossterm. Transformation of the data takes advantage of mutual information available across pixels. Transformation is typically by Fourier transform into a spatial Fourier transform space, however it is to be understood that, within the scope of the present invention, other transforms, including specialized linear and non-linear transforms, may be employed. By transforming the isolated cross-term back into space coordinates, the amplitude and phase of the aggregate fields of view are computed (312), as described herein.

Example I

Application of an SRW in accordance with an embodiment of the present invention is now described with reference to FIGS. 4A-4C. The embodiment now described exemplifies optical nanoholography as applied to a scattering-type SNOM (s-SNOM). A plasmon IR-gap dipole antenna serves as sample 210 and, usefully for demonstrative purposes, exhibits well-defined amplitude and phase contrast. The sample topography in FIG. 4A shows the IR-gap nanoantenna consisting of two coaligned metal nanorods, each 3.6 um in length and 100 nm win width, that are separated by a 100 nm wide gap. A close inspection of the gap region (digital zoom-in shown in the right column of FIG. 4C reveals individual fringes: Lines showing strong contrast (white and black colors) correspond to a constructive interference of the scattered antenna near fields and the reference wave, while the uniform grey-colored lines reflect a destructive interference.

The s-SNOM employed in this Example is based on an atomic force microscope (AFM) where a dielectric tip acts as a scattering near-field probe 222. The sample 210 and the tip 222 are illuminated from the side under an angle of about 50° to the surface normal with a focused laser beam at a wavelength of $\lambda=9.3$ μm. The tip is scanned over the surface of the sample, and the p-polarized scattered field is recorded as a function of tip position spaced at 10 nm intervals. In order to implement nanoholography, the light scattered out of the tip-sample system was superimposed with a reference field with a linear-in-time phase function. The reference phase was controlled to change by $2\pi$ every 4 steps in the y-direction, as in the simulation shown in FIG. 1(e), resulting in an SRW that is hyperoscillatory with magnitude of $k_\|$ that is 232 times the free-space wavenumber.

FIG. 4A shows the topography of an IR-gap antenna 401, while FIG. 4B shows a simultaneously acquired hologram of the IR-gap antenna. (A magnified view is shown on the right.) The hologram exhibits hyperoscillatory fringe pattern, i.e. the distance between signal maxima is 40 nm=lambda/232. In order to reconstruct the near fields $U_s$ of the sample, the Fourier Transform (FT) of the hologram is calculated, and depicted in FIG. 4C. Separation of the direct term, $A_r^* \widetilde{U}_s$ (upper part 407 of the FT), and its conjugate $A_r \widetilde{U}_s^*$ (bottom part 408 of FT) is clearly apparent in FIG. 4C. In the center of the FT, the autocorrelation term C (409) appears. The direct term $A_r^* \widetilde{U}_s$ (120 in FIG. 1M) is isolated (as shown in FIG. 4D) by applying a Hamming window function 405 as indicated by the dashed box in FIG. 4C. Shifting this term to the center and applying the inverse FT, the complex-valued near-field distribution $U_s$ may be obtained. FIG. 4E shows the resulting amplitude map, while FIG. 4F shows the resulting phase map. This field distribution reveals the typical dipolar mode of an optical antenna, characterized by strong field values at the rod extremities known to oscillate out-of-phase by 180°. This example clearly reveals the capability of nanoscale-resolved amplitude- and phase-imaging with an artificial reference wave.

Example II

Figures 5A, 5B, 5C:
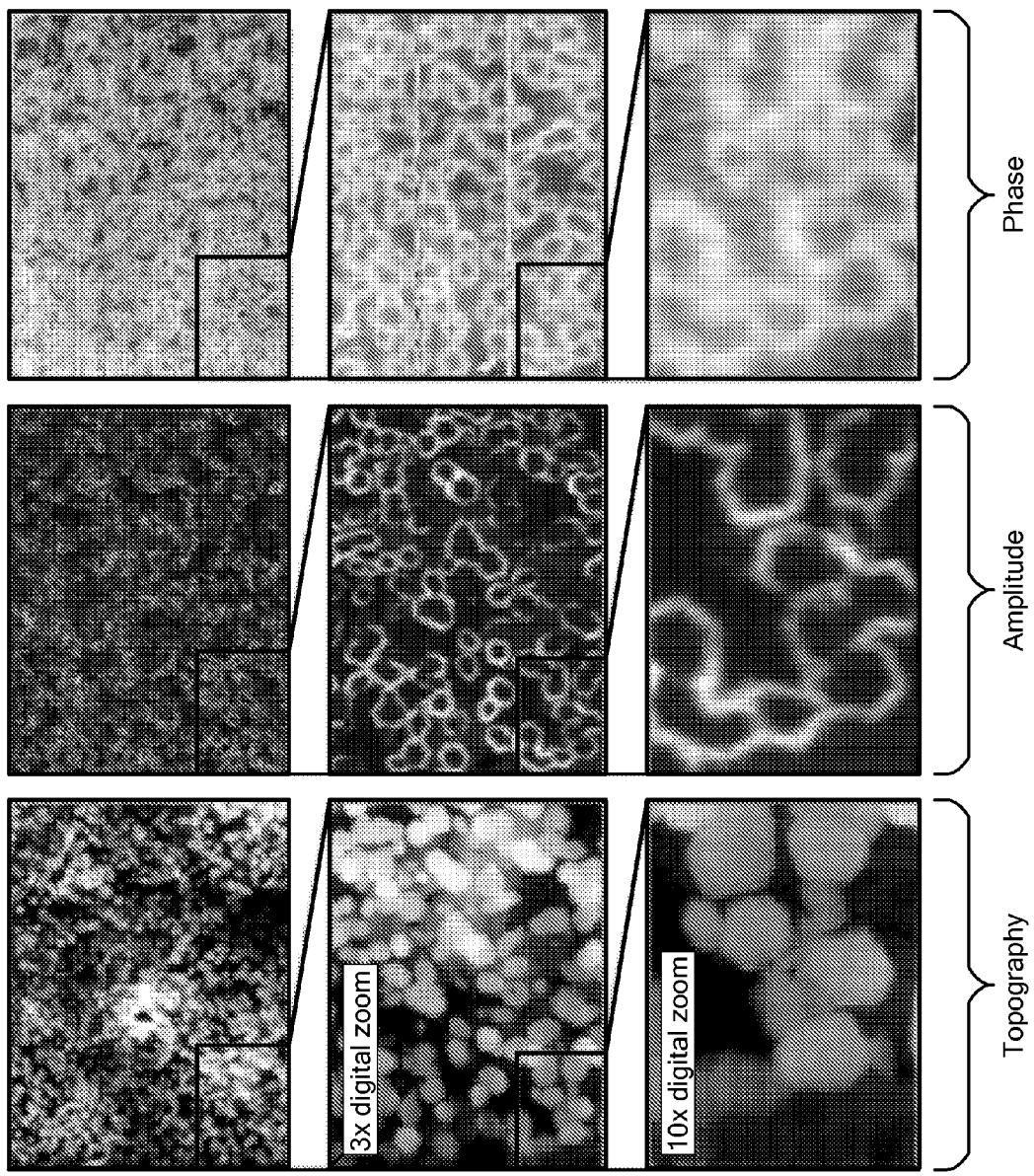
FIGS. 5A-5C show the topography (left), and the infrared amplitude (middle), and phase (right) images of a cross section of a ZnO nanowire array at successive magnifications in accordance with an embodiment of the present invention. Illumination and reference wavelength is about 10 micrometer.

The improvements in speed of the imaging in nanoholography enable much larger images to be acquired, thus shifting routine practice in phase-resolved near-field microscopy from kilopixels into the realm of digital cameras, namely, megapixels. FIG. 5A depicts an unprecedented 20 μm×20 μm, 2.25 Megapixel (1500×1500) optical near-field phase and amplitude image, acquired in 55 minutes. The sample 210 is a polished cross section of a ZnO nanowire array that shows a characteristic near-field amplitude and phase contrast owing to a radial doping profile. On each nanowire, a ring-like contrast is apparent in both amplitude and phase The topography and optical images in FIG. 5A show the full measured area. To reveal individual wires, an exploded view of the boxed area is shown in FIG. 5B, while another subsequently exploded view is shown in 5C. Note that the exploded views are digital zoom-ins into the data of FIG. 5A and were not obtained by rescanning at high-resolution, rather, all displayed data were acquired in a single continuous scan over 55 minutes. A pixel is 13 nm wide, smaller than the tip radius of 20 nm, and, thus, the images are resolution-limited by the radius of the tip rather than sampling rate. The images clearly show the ring-like shapes in the amplitude and phase images with a lateral resolution of 13 nm (apparent, for example, in the dark rim between two bright rings in FIG. 5C). With the given sample, the ability to record nanoscale-resolved optical images of a width of tens of micrometers allows for an easy and fast identification of single isolated nanowires from the vast number of clustered nanowires.

Examples provided above illustrate significant advantages of nanoholography as a technique, providing, as it does, important insights into the nanoscale structure of samples. Nanoholography makes this emerging technology more broadly accessible by easing implementation, and more practically useful by dramatically reducing imaging time.

Generally, the SRW concept opens new horizons in holography. Holography is no longer constrained to physically realizable reference fields. These ideas may be applied advantageously not only to near-field methods like SNOM where nanoholography is made possible, but also to other scanned imaging techniques including far-field scanning methods like scanning confocal microscopy where the probe position, $r(t)$, is replaced by the position of the focus.

While examples have been provided where the phase function of the reference is a simple phase ramp, $\varpi t$, it is to be understood that Eq. (1) points to a large range of options within the scope of the present invention. Nonlinear (in time) reference wave functions may be used to provide a rapidly oscillation reference in select regions of the sample and so acquire high spatial-bandwidth data only where needed, further speeding image acquisition. Reconfigurable reference fields may be made into Hadamard masks or random basis functions used to implement compressive holography, recently shown great potential in imaging sparse objects from minimal data sets. In SNOM, the reference field may be controlled by feedback from the AFM topography to paint onto the acquired image a linear phase gradient that follows the contours of the sample. Specialized SRWs may be tailored to rapidly identify defects and irregularities in manufactured samples.

Synthetic optical holography, as described in accordance with the present invention, may advantageously provide the fastest image acquisition in near-field phase imaging today, improving imaging times by one to two orders of magnitude. While current schemes rely on pixel-by-pixel interferometry, where many data must be acquired for each pixel, in holography the information is distributed (multiplexed) so that only one datum is acquired at each pixel. Thus, the speed of imaging in nanoholography is only limited by the mechanical speed of the underlying AFM. Moreover, nanoholography is relatively easy to implement. With constant-velocity scanning and a linear phase ramp in the reference, there is no synchronization required between the reference arm and the probe. An error in synchronization between scanning tip position and phase simply amounts to an offset in the origin of time for the phase function, and the additional global phase, may be wrapped into $\phi_0$. The optical system essentially becomes decoupled from the mechanical AFM system, greatly simplifying implementation.

Multiplex Acquisition of Other Data

In prior art holography it is well-known that multiple images may be written into the same holographic plate and recovered separately. This is done by encoding each image on a different reference wave. If two images are acquired from fields which do not interfere, either because they are mutually incoherent or because the field components are orthogonal, then the multiplex recording of holographic images may be carried out simultaneously.

Frequency-Multiplexing Along a Single Axis in the Fourier Domain

Figure 6A:
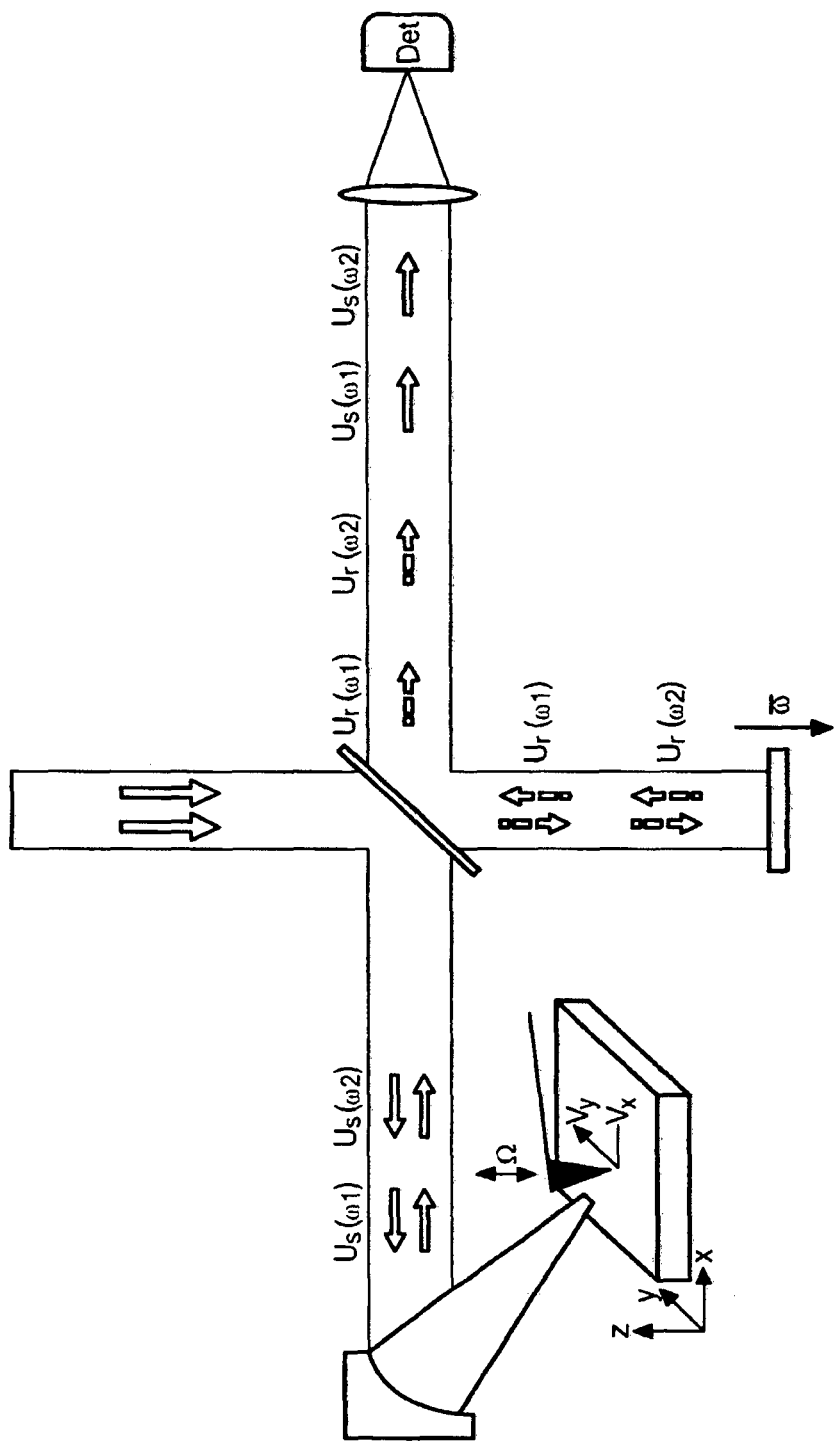
FIG. 6A shows a nanoholographic apparatus, in accordance with an embodiment of the present invention, in which amplitude and phase images may be derived at multiple wavelengths by virtue of separating their crossterms in Fourier transform space, and depicted in two dimensions in FIG. 6B, and in three dimensions, in FIG. 6C.

In accordance with embodiments of the present invention, wavelength multiplexing may be accomplished with a single reference arm, as shown in FIG. 6A, where two frequencies, $\omega_1$ and $\omega_2$ are shown for heuristic convenience, although the extension to n frequencies is evident to a person of ordinary skill in the art. When imaging at multiple frequencies, a single reference arm displacement produces different phase ramps for the different frequency components of the field, $\varpi_1$ and $\varpi_2$. For example, with a bichromatic source with lines at $\omega_1$ and $\omega_2$ and a single reference arm, the effective $k_\parallel$ vectors are related by $k_{2\parallel} = \omega_2/\omega_1 k_{1\parallel}$, assuming that phase wrapping is not an issue. Thus for sufficiently widely spaced frequencies, the complex field at all frequencies may be acquired simultaneously and recovered by filtering the Fourier transform of the data, shown in FIG. 6B, appropriately. If frequencies, $\omega_1$ and $\omega_2$ are sufficiently well separated, fast phase ramps are not necessary and phase-wrapping may not be needed.

Making Use of the Whole Fourier Space

In the event that the reference arm delay is varied rapidly enough to induce phase wrapping in the y-direction, a further advantage may be gained in separating the signals at distinct frequencies. Explicitly, suppose that $k_{1\,y} = n2\pi/\Delta_y$, that is $\bar{k}_{1\,y} = \mathrm{mod}_{2\pi/\Delta_y}(k_{1\,y}) = 0$, so that the Fourier transform of signal at frequency $\omega_1$ is displaced purely along the $k_x$-axis. Then $$\bar{k}_{2y} = \mathrm{mod}_{2\pi/\Delta_y}\left(\frac{\omega_2}{\omega_1} n 2\pi/\Delta_y\right) = (2\pi/\Delta_y)\mathrm{mod}_1\left(\frac{\omega_2}{\omega_1} n\right).$$

Figure 6B:
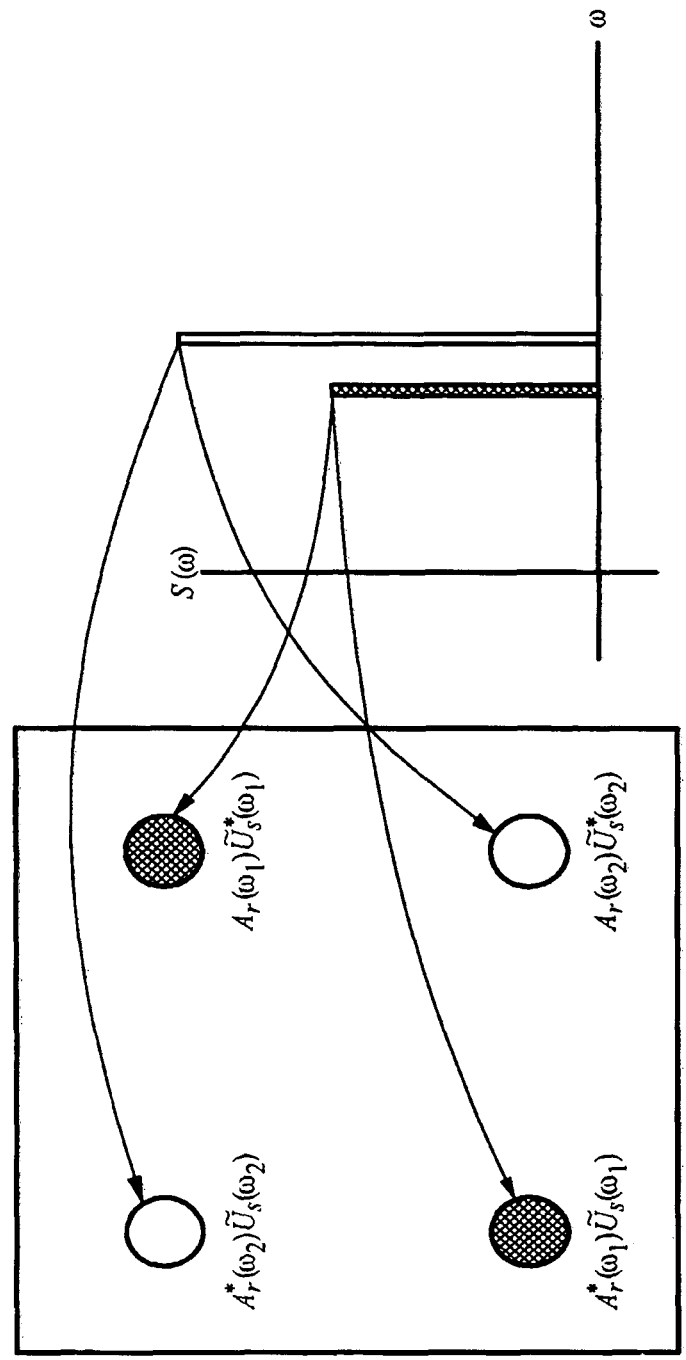

Thus $\bar{k}_{2y}$ may be as large as $2\pi/\Delta_y$, the entire bandwidth of the dataset. With an appropriate choice of both $\varpi_1$ and X the Fourier transform of the signals may even be displaced along the principal Cartesian axes. Thus the signals at two distinct frequencies may be separated in the Fourier transform space even for the case that the frequencies are not widely separated, as shown in FIG. 6B. This is a very important result. It means that one could make use of a source as in comb spectroscopy where the source spectrum consists of several closely spaced but discrete spectral lines. Each spectral line may thus be mapped to distinct and nonoverlapping regions in the Fourier domain and the complex images recovered as described above by filtering. It may be noted that wavevectors $k_x$ and $k_y$ may be controlled independently (as by two piezos, for example).

Figure 6C:
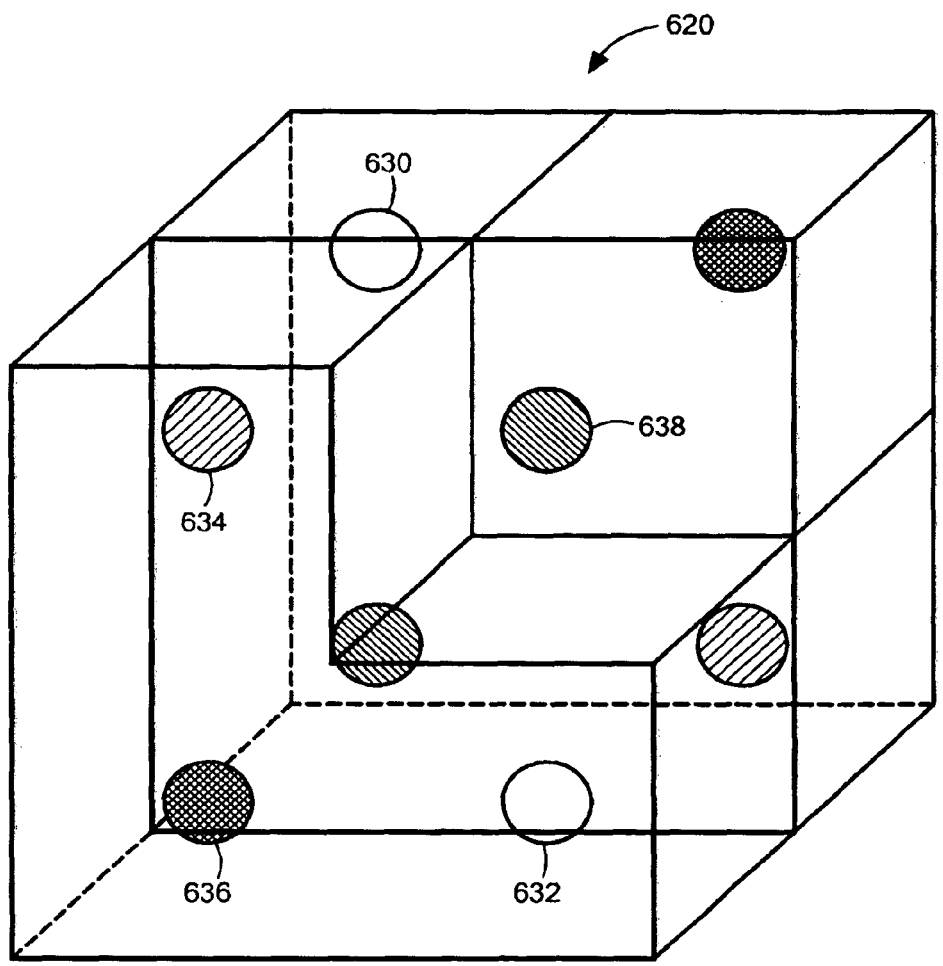

A particularly advantageous embodiment may be employed in conjunction with confocal microscopy where the field of view 201 (shown in FIG. 2A) may be scanned in three dimensions. In that case, a spatial Fourier transform volume, depicted in FIG. 6C, is ample for accommodation of a large number of direct crossterms 630, 634, 636, and 638, and their respect conjugates 632, allowing for their separate filtering and the derivation of distinct amplitude and phase images at multiple wavelengths.

Multiplexing with Multiple Reference Arms

Figure 6D:
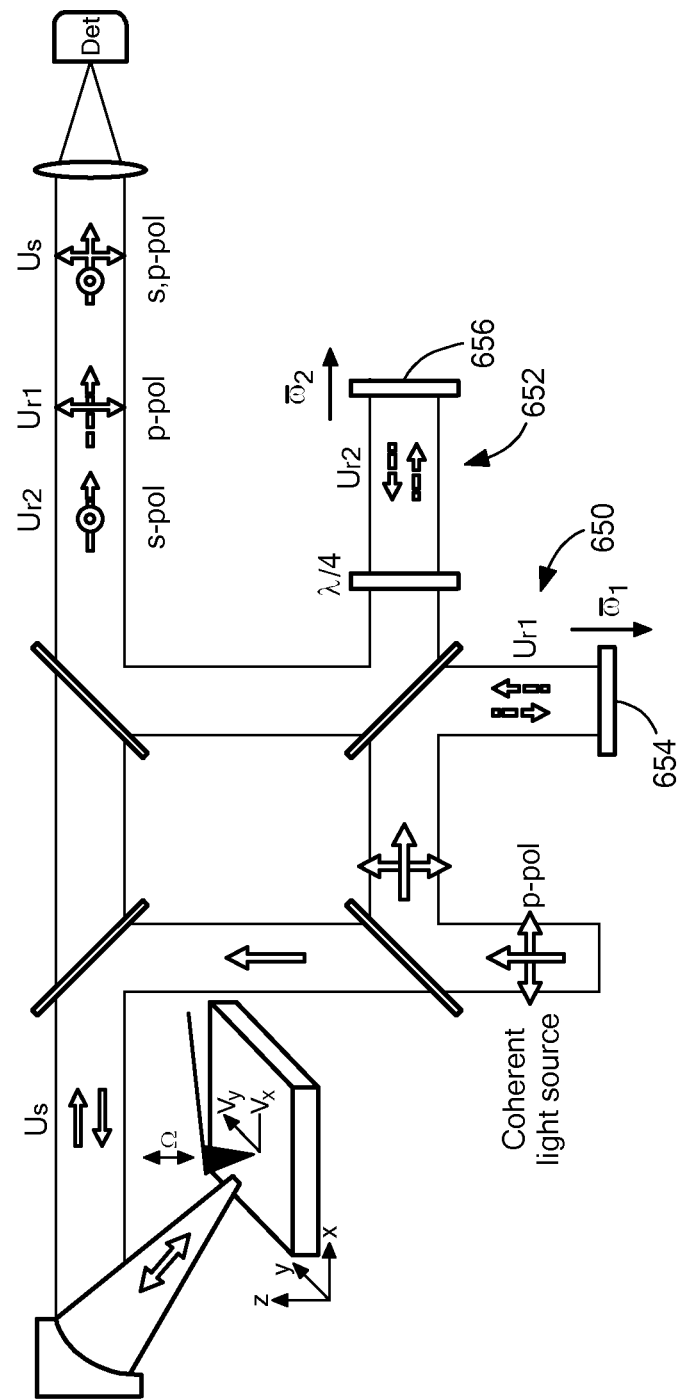

Referring now to FIG. 6D, the introduction of multiple reference arms, designated generally by numerals 650 and 652, each with respective phase modulators 654 and 656, opens up other possibilities. Multiplexed signals with a variety of rates of phase variation map to a variety of regions in the Fourier transform domain, designated generally by numeral 620 in FIG. 6C, even for fields at the same frequency, ω. The multiplexed waves may be characterized by various features which allow their separation post-hoc. For example, and without limitation, the multiplexed waves may vary in frequency, polarization, time of arrival at the detector, etc. With sufficient separation in the Fourier domain, as shown in FIG. 6E, the complex fields may again be recovered by appropriate filtering. For example, the reference field may be split into two orthogonal polarization states, and the phase of two states may be varied at a different rates $\overline{\omega}_s$ and $\overline{\omega}_p$. As in the case of signals at two frequencies, the reference wavevectors, are related $$k_{s\|} = \frac{\overline{\omega}_s}{\overline{\omega}_p} k_{p\|},$$

implying that the two signals will be displaced by collinear vectors in the Fourier space. However, the foregoing example is provided solely by way of example, and without limitation. It is to be understood that the wavevectors $k_{s\|}$ and $k_{p\|}$ are not required to bear any relation to one another within the scope of the present invention. However, once the phase-wrapping effect is taken into account, as in the single-arm multifrequency case, appropriate choice of rates of phase variations, scan length, step size, etc. allow for the construction of non-parallel $\overline{k}_{s\|}$ and $\overline{k}_{p\|}$, in principle even obtaining $\overline{k}_{s\|} \perp \overline{k}_{p\|}$ as above.

Examples of Three-Dimensional Recording Method for Near-Field Tomography

Examples are now provided of three-dimensional methods for near-field tomography. Non-SOH methods of near-field tomography are described in U.S. Pat. No. 7,978,343 (to Sun et al.), which is incorporated herein by reference. As has been made clear above, use of tip 222 as a local probe in other contexts of SOH is never to be confused with its use as a near-field probe, an example of which is now described.

Stepping the local probe to a plurality of successive probe positions in three dimensions may be implemented by literally stepping the probe in three dimensions. This means that the probe position is updated and the probe remains stationary at that position during some time. In SNOM, however, local probe 222 is vibrated in height, thus the third dimension is not accessed in a discrete, but rather in a continuous, fashion. This allows for treating this situation as a 2D stepping process for the x,y coordinates and using multiplexing to encode the height variation. Data can be recovered using a time-division demultiplexing approach or a spectral-domain demultiplexing approach, quite similar to methods described above in the context of Spectrally-Resolved SOH. At each voxel, amplitude and phase are obtained. This data set can be used for tomographic reconstruction as described in Sun et al., *Nanoscale optical tomography using volume-scanning near-field microscopy*, Applied Physics Letters, vol. 95, pp. 121108-121108-3, (2009).

The description of SOH as provided herein may similarly also apply to other methods that use vibration of the local probe, as will be apparent to persons of ordinary skill in the art. In particular, stepping may be continuous in one, two, or all, dimensions, within the scope of the present invention.

Figure 7A:
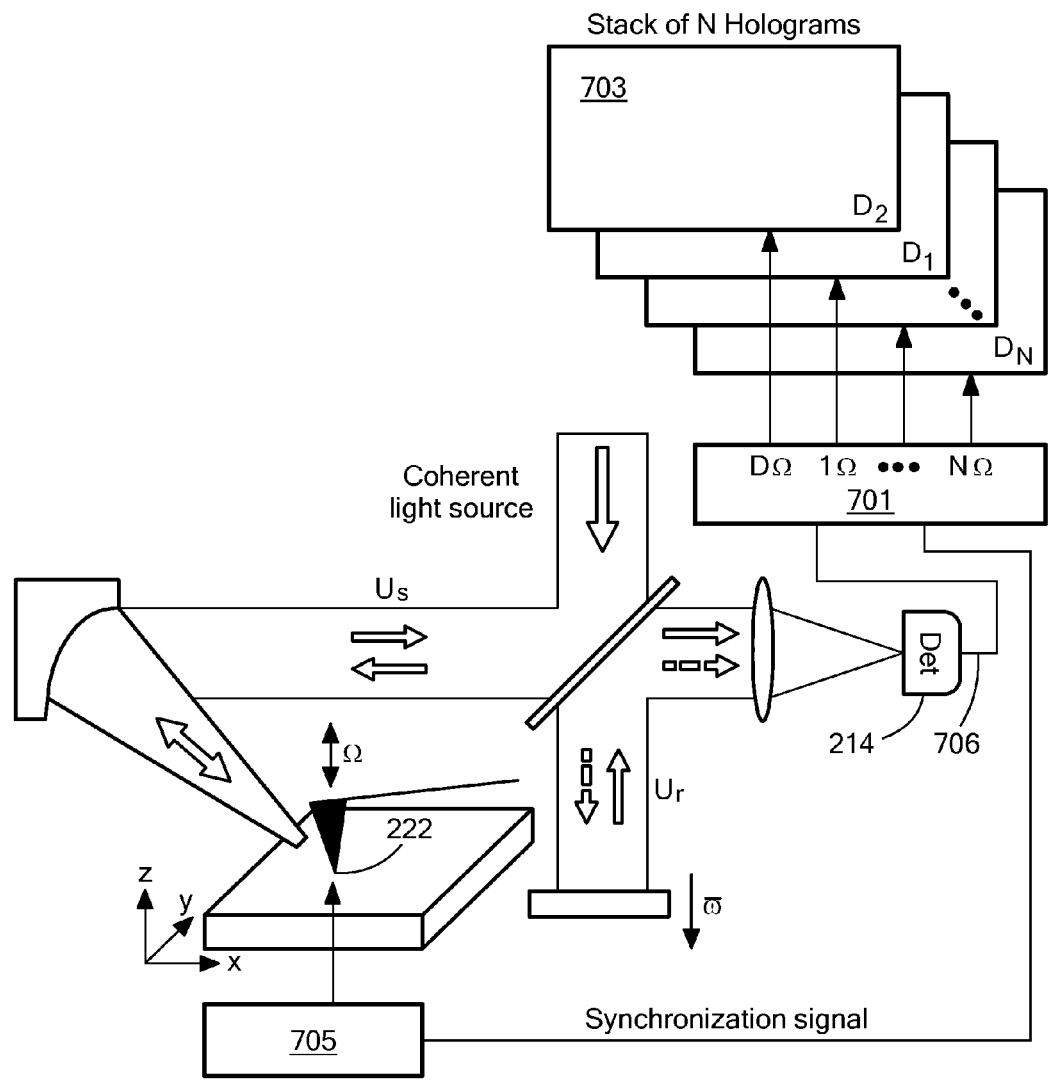
FIG. 7A schematically depicts the use of a near-field probe as an example of a local probe used in accordance with an embodiment of the present invention.

One such example, described now with reference to FIG. 7A, entails vibration of local probe 222, driven in response to a drive signal provided by generator 705 at frequency Ω. Successive demodulation by demodulator 701 of the detector signal I (706) generated by detector 214 yields N holograms 703. To obtain image data in the ẑ dimension, demodulation and recording of all harmonics nΩ with n=0, 1, 2, 3, . . . N is performed. Recording all harmonics as a function of the probe position yields a stack of N holograms. Note than N is not limited in principle, although data processing constraints require that N be finite. The detector signal 706 is simultaneously demodulated at frequencies nΩ with n=0, 1, 2, 3, . . . , N, yielding a set of demodulated signals $D_n$. Recording the demodulated signals $D_n$ as a function of the probe position yields a stack of holograms #0 . . . #N 703. Each hologram #n may be processed individually, or the stack of holograms #0 . . . #N may be considered a Q+1-dimensional space (here: Q=2) and processed as described above.

Figure 7C:
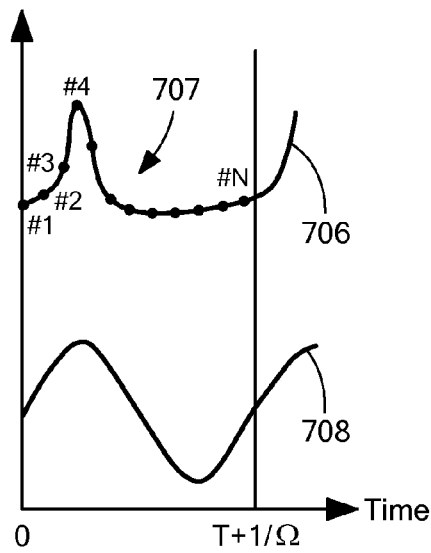
FIG. 7B depicts an embodiment in which a detector signal is temporally multiplexed in accordance with another embodiment, with a plot of the temporally sampled signal shown in FIG. 7C.
Figure 7B:
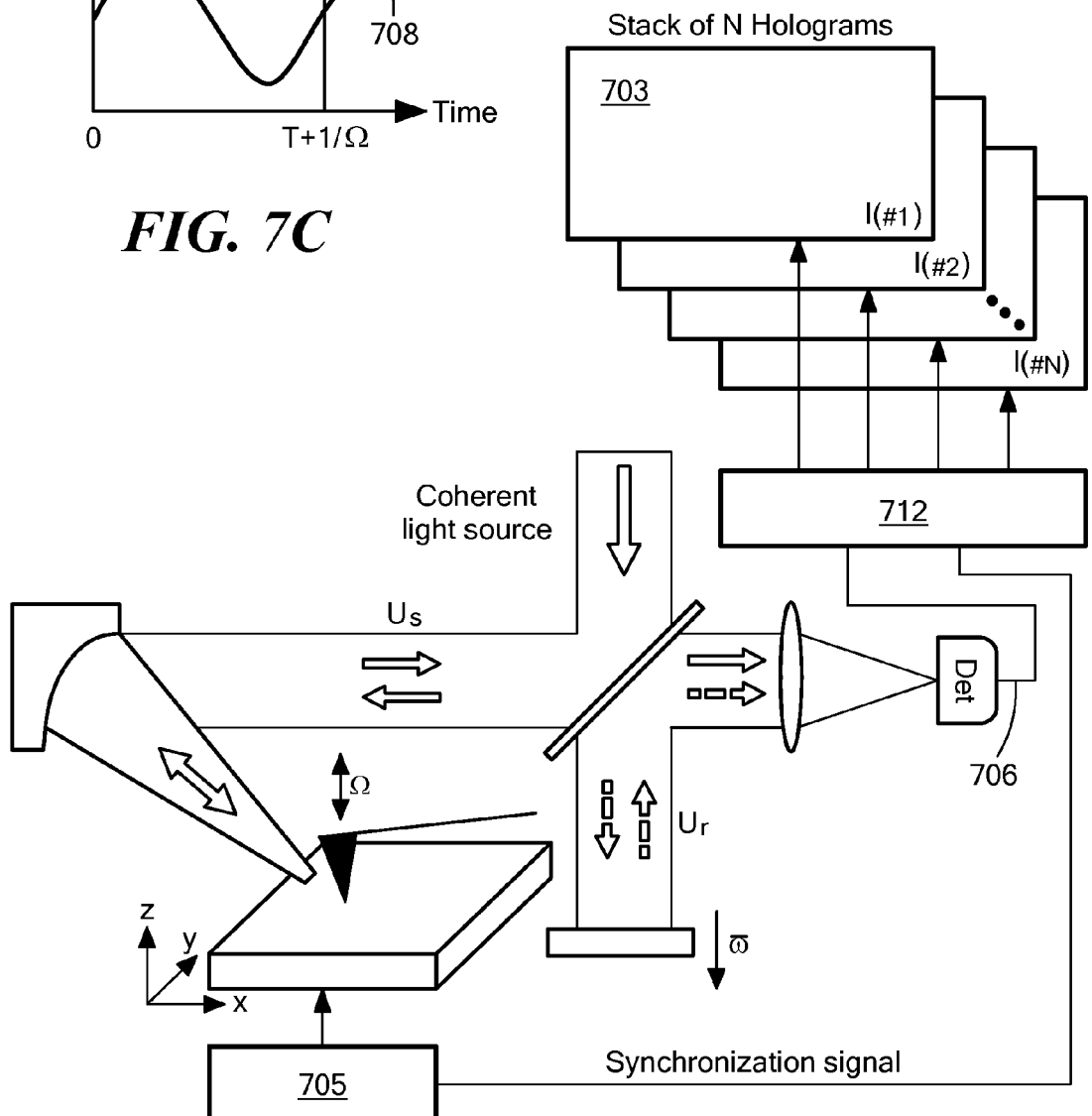

In accordance with another embodiment within the scope of the present invention, described now with reference to FIGS. 7B and 7C, vibration of the local probe, at frequency Ω, with waveform 708, as described above, and subsequent time-division demultiplexing of the detector signal I (706) yields N holograms 703. The time-division demultiplexing is depicted in FIG. 7C, showing sampling at points 707 during the course of each vibration cycle.

Detector signal 706 is recorded during one oscillation cycle T=1/Ω with a digitizer card 712. The sampling rate is chosen such that N data points are acquired during time T. Each data point #n contains the momentary detector signal I at the time when the data point #n was recorded. Storing the data point #n as a function of the probe position produces a hologram #n. Thus, a stack of hologram #1 . . . #N is obtained. Each hologram #n may be processed individually, or the stack of holograms #0 . . . #N may be considered a Q+1-dimensional space (here: Q=2) and processed as described above.

Alternatives to Stepping the Probe

Mechanical stepping of the probe is only one way of scanning that may be employed in recording a hologram in accordance with the present invention. Other parameters characterizing a physical medium may also be scanned within the scope of the invention. Other scanning methods include: (a) scanning a voltage applied across a portion of the sample, (b) scanning the temperature of the sample, (c) scanning any other physical parameter, such as magnetic field, applied to a portion of the sample, or (d) "scanning" the time by monitoring a dynamic process or movement of a developing sample. In such cases, the x- and y-axes of the hologram do not indicate distance, but rather voltage, temperature, time etc. This applies to all SOH methods. A "scanning mechanism" shall refer to any one of the physical devices, all known in the art, for imposing the aforesaid variations in the values of physical parameters associated with a sample.

DEFINITION

The value of a scanned parameter at any particular step of the scanning process shall be referred to herein as a "locus" (or plural, "loci"). Thus, a locus is a dimension of a hologram that need not be physical space but may include such parameters characterizing the sample such as voltage, temperature, etc.

Particularly, each applied variation spans a new dimension of the hologram. For example, scanning the local probe in x,y directions and further varying the sample voltage creates a 3-dimensional hologram.

Instead of being applied to the sample 210, for example, scanning methods may be applied to other parts of a microscope setup are also within the scope of the present invention. For example, scanning may be applied to the source 204 or to modulators introduced in the interferometer 216 (shown in FIG. 2D).

Alternative Multiplexing Modalities

Whereas multiplexed SOH has been described above in the context of a swept source (with reference to FIG. 2D, for example) and a mechanical vibration of a local probe (described above, with reference to FIG. 7B, which depicts the special example of a near-field probe, not to be mistaken for the general case of a local probe), it is to be understood that other multiplexing modalities of SOH may be practiced without straying from the scope of the present invention as claimed.

For example, within the scope of the present invention, scanning may also be applied to such other quantities as (a) scanning a voltage applied to part of the sample 210 or (b) illuminating the sample 210 with a second source to provoke changes in the sample. Moreover, instead of (or, in addition to) applying multiplexing with respect to some aspect of the sample, multiplexing may also be applied to other parts of a microscope setup. For example, multiplexing may be applied to the source or to modulators introduced in the interferometer 216.

Common-Path (FTIR-Like) Synthetic Optical Holography

The term "Synthetic Optical Holography," as used herein and in any appended claims, may also be applied where sample 210 is disposed, not within one arm of an interferometer 216, as depicted, for example, in FIGS. 2A and 2B, but, rather, in a common-path segment of such an interferometer, where both paths of the interferometer are combined. Such a configuration, referred to herein as a "symmetric Fourier Transform Infrared" (or, hereinafter, "FTIR") configuration, is now described with reference to FIG. 8. The configuration of FIG. 8 is referred to as an FTIR (or FTIR-like) configuration, designated generally by numeral 800, in that such a configuration is typically used in FTIR.

Figure 8:
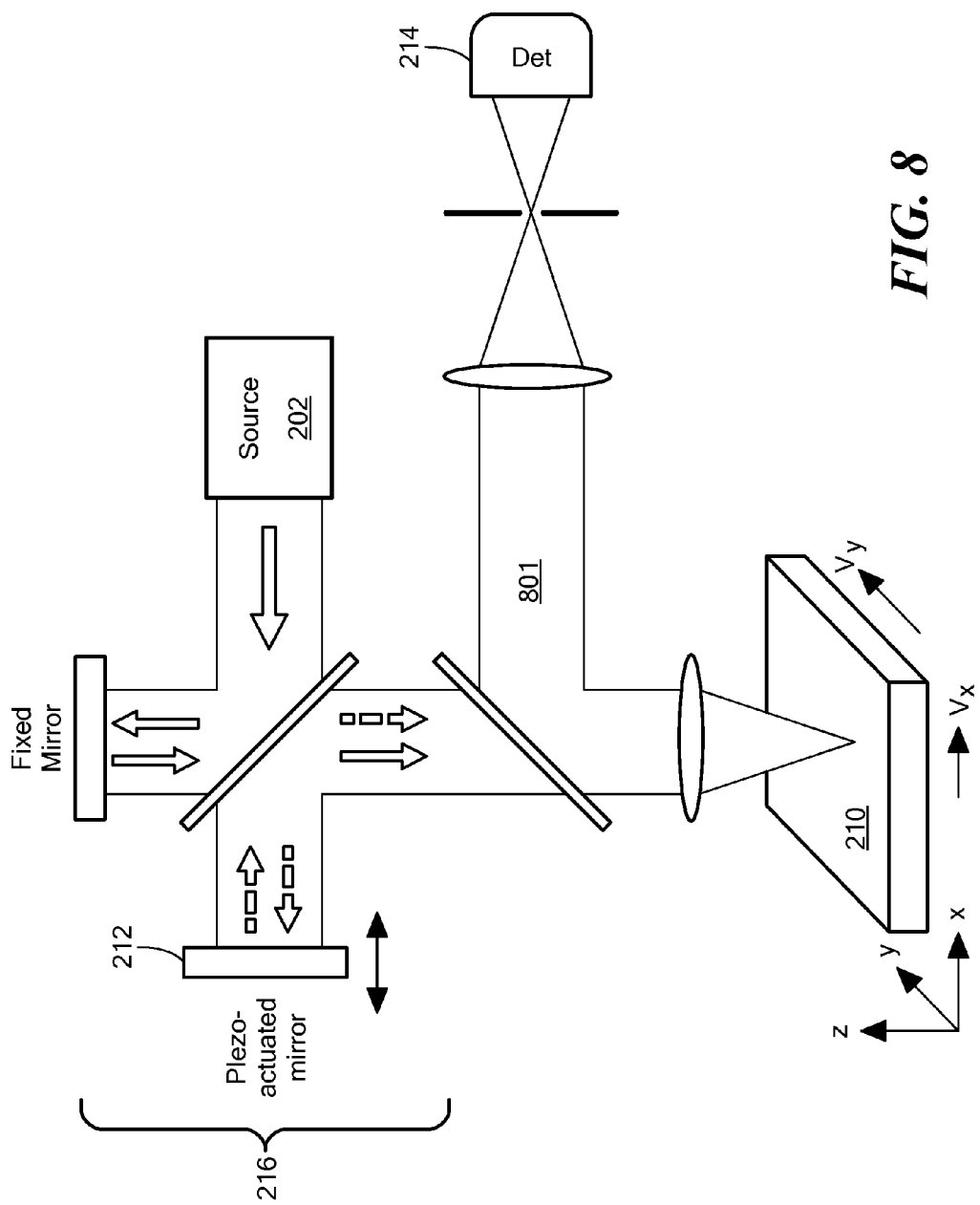
FIG. 8 depicts an FTIR-like configuration of an SOH apparatus in accordance with an embodiment of the present invention.

In FTIR configuration 800 of FIG. 8, the illuminating and reference beams both fall on the sample 210, and the total field 802 scattered from the sample is collected and measured as a function of reference arm delay. In this configuration, while the phase-information is not accessible, intensity may be obtained as a function of frequency. This configuration is typically used with sources 240 emitting a plurality of wavelengths. SOH is performed as described in previous descriptions of multi-wavelength operation. The frequency information is encoded spatially across the hologram. This is in contradistinction to common FTIR, where the frequency information is temporally encoded by taking an interferogram at each pixel. The advantage over pixel-by-pixel is speed, just as the advantage of holography over pixel-by-pixel interferometry is speed. The advantage of this approach versus phase-resolved SOH is that it is common-path. This is the same reason FTIR is largely practiced in the symmetric mode. Any disturbances to the system affect both beams the same way and so the relative phase between the beams is robust.

It is typically preferred that strong sources be used with FUR-like methods, allowing for short integration times (typically, in the millisecond regime). With thermal sources, as an example for a weak source, integration times are in the seconds to minutes range, thus the full speed of this method cannot be achieved. The embodiment described with reference to FIG. 8 is compatible with stepping the local probe, the combined beam or the sample, in arbitrary dimensions, i.e., in 1 dimension (line), 2 dimensions (image), or 3 dimensions (volume).

SOH Using One or More Arrays of Pixel Detectors

Figure 9:
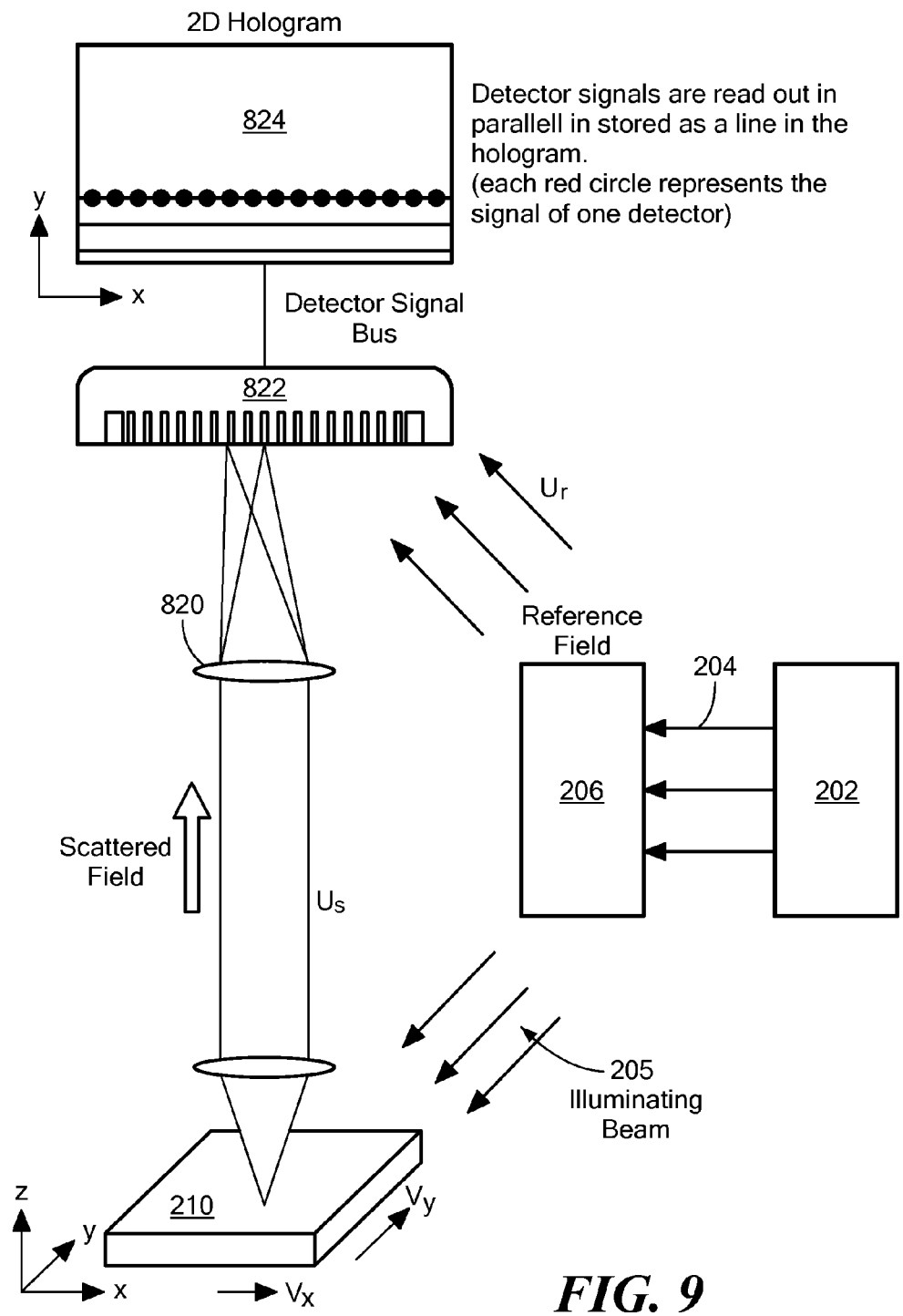
FIG. 9 depicts an example of detection of a scattered field and SOH processing in a spatially-resolved way, using a one-dimensional array of detector pixels, in accordance with an embodiment of the present invention.

In embodiments of the present invention previously described above, the scattered field is evaluated for only a single position of the local probe or illuminating beam at a given time. Moreover, the superposition with the reference field is detected by a one-pixel detector. This concept can be extended by detecting the scattered field in a spatially-resolved way, described, now, with reference to FIG. 9. For example, one or more illuminating beams may impinge upon the sample 210 and the scattered light $U_s$ from one or more positions on the sample may be detected in parallel at a given time. To this end, an array of one-pixel detectors is used. Ideally, each one-pixel detector is assigned to a specific position on the sample, which can be conveniently done by an imaging system using lenses. This extension allows acquisition of data for a single hologram in a parallel fashion. For example, the hologram data may be recorded line-wise instead of pixel wise. This embodiment of the present invention also advantageously provides for simultaneous acquisition of a plurality of holograms.

Beam 204 from source 202 is split by beamsplitter 206 into illuminating beam 205 and reference beam $U_r$. As sample 210 is scanned in the y directions, scattered beam $U_s$ from sample 210 is collected by imaging system 820 and combined with reference beam $U_r$ at line camera 822, spatially resolving the x direction.

A phase function is generated with reference beam $U_r$ by employing amplitude or phase modulation. The signal of the detectors is recorded as a function of the sample position, thus a line of the hologram is obtained, and a 2D hologram 824 is obtained by line-wise recording the data. The hologram 824 may then be processed using SOH techniques elsewhere described herein.

It is noteworthy that oblique incidence of the reference beam is not a requirement. The reference beam may also be superimposed with the scattered fields at the camera by sending the reference beam through the camera lens, and/or at normal incidence to line camera 822.

Figure 10:
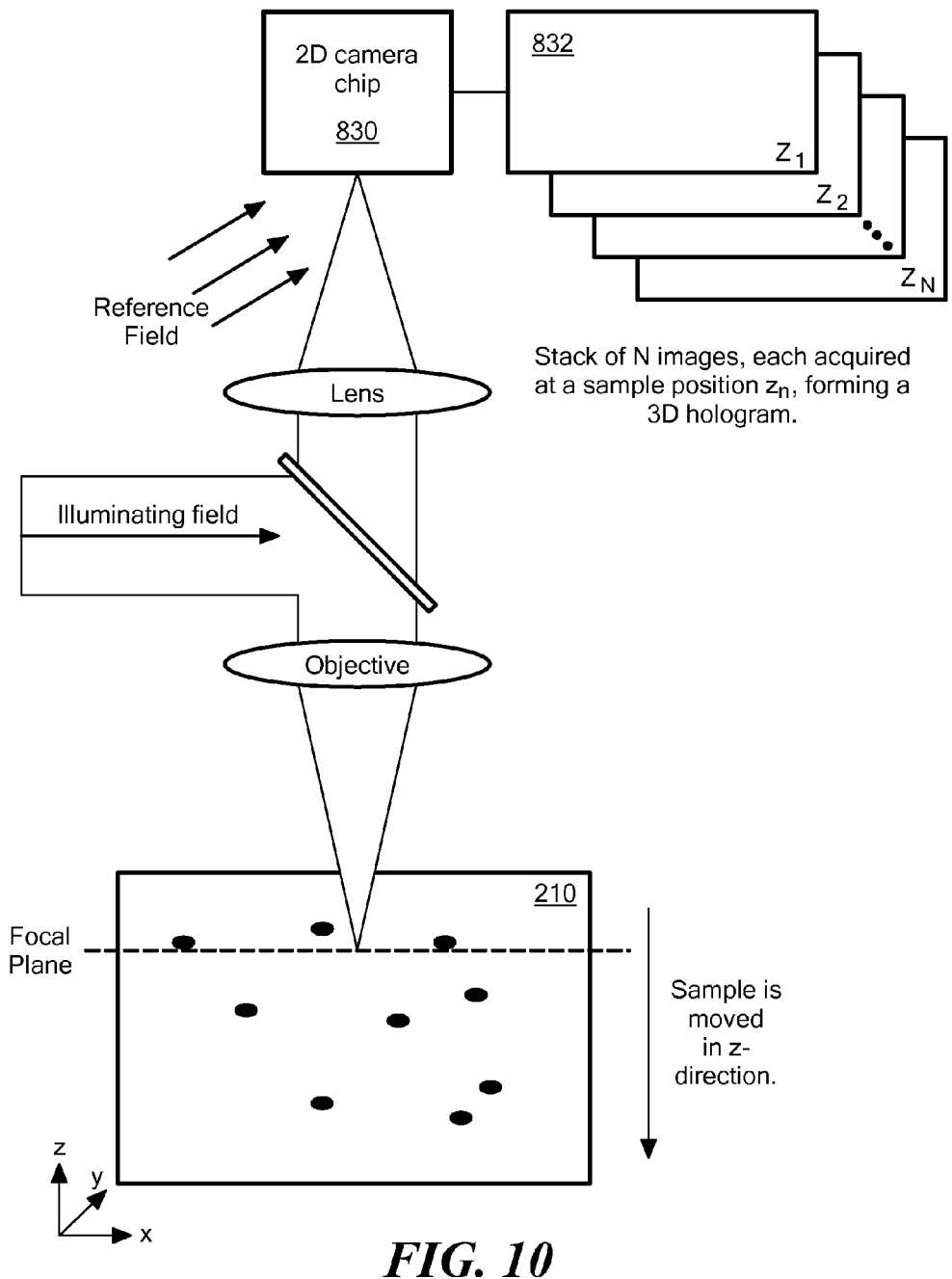
FIG. 10 depicts a further example of detection of a scattered field and SOH processing in a spatially-resolved way, in this case using a two-dimensional array of detector pixels, in accordance with an embodiment of the present invention.

In accordance with a further embodiment of the present invention, described now with reference to FIG. 10, an image camera (two-dimensional) 830 may be employed for generating an interferogram 832 at each of a plurality of positions of sample 210, stepped in the z direction (normal to camera array 830), based on superposition of scattering and reference beams. Three-dimensional holograms are obtained by plane-wise recording the interferometric data, and processed as described above. Again, oblique incidence of reference beam $U_r$ is not required.

While one- and two-dimensional arrays have been described, it should be understood that any configuration of one-pixel detectors may be employed, within the scope of the present invention. Moreover, more than one illuminating beam may illuminate sample 210 in practicing the present invention. In the embodiments described in the immediately preceding sections, as in other embodiments of the present invention, it is to be understood that alternative methods of stepping may be employed, as described above, including, in particular, a series of images taken of a dynamic process, such as movements in biological samples, for example. Similarly, methods employing spectroscopic detection described above may also be employed in conjunction with detector arrays, within the scope of the present invention.

Alternative Data-Processing Schema in Monochromatic and Spectrally-Resolved Implementations of SOH and Quick-Look Holographic Imaging It is to be understood that, within the scope of the present invention as claimed, it is not required that data to support the entirety of ultimate images be acquired prior to Fourier transformation. A contemporaneous data set may be analyzed, and images may be derived on the basis on a partial dataset acquired to an intermediate point in the course of sequential scanning. This allows for a provisional view of analyzed data, while additional data are continuously acquired and aggregated in a larger data set, on the basis of which amplitude and phase images may be recalculated.

Description of data processing in the context of SOH, as presented herein, has focused on classical holographic processing methods of taking the FT of the data and then filtering in the FT domain before transforming back by inverse Fourier transform (IFT). It is to be understood that such description has been by way of heuristic example and without limitation. Of course, the FT-filter-IFT process may be accomplished in a single step as a convolution in the domain of raw data. The convolution kernel has an effectively limited range, and, consequently, finite truncations of the kernel would seem reasonable. Thus, several local methods are suggested in which the original data are processed using only the pixels in a small neighborhood of the pixel of interest, or some other subset of the data.

In a "two-line" method, in the case of homodyne interferometric detection with phase stepping, a series of detector signals are recorded for a stepwise-shifted reference phase. Details about the latter can be found, for example, in Novak, *Five-Step Phase-Shifting Algorithms with Unknown Values of Phase Shift*, Optik, vol. 114, pp. 63-68 (2003), and Surrel, 63-68 and Surrel, *Design of Algorithms for Phase Measurements by the Use of Phase Stepping*, Applied Optics, vol. 35, pp. 51-60 (1996), both of which articles are incorporated herein by reference. A step-shifted phase-shift method has been implemented in SNOM, as described by Taubner et al, *Performance of visible and mid-infrared scattering-type near-field optical microscopes*, for Journal of Microscopy, vol. 210, pp. 311-14 (2003), incorporated herein by reference. There, a line is scanned with a reference phase setting of 0°, and the same line is rescanned with a reference phase setting of 90°. While the first line yields a term proportional to the cosine term of the complex-valued line, the second line yields the sine term. Accordingly, a single complex-valued line can be constructed with these two lines.

For purposes of SOH, a "two-line" method, similar to what is done in phase-stepping homodyne interferometry, may be employed, but the 90-degree phase steps are taken across adjacent lines using the SRW method. Assuming that the phase shift of the reference wave between two lines is 90°, the first line can be considered to contain the cosine term, the second line the sine term, the third line the—cosine term and so forth, of the complex-valued electric field $E_s$ of the sample arm. Two lines can be pairwise combined to form a single line containing complex-valued data by a simple addition (i=sqrt(−1)):

New Line 1=1*Line 1+1$i$*Line 2

New Line 2=1$i$*Line2−1*Line 3.

It should be noted that the phase step need not be 90°, nor need it be equal across all lines. When the phase step is known, the complex-valued field can be calculated, within the limits of phase-stepping interferometric detection. In this case, the factors "1", "1i", "−1" are replaced by the corresponding coefficients, which can be different for each line.

More generally, N-lines can be combined to form one line, as described in phase-stepping homodyne interferometry. By combining 3 or more lines to one line, the autocorrelation term C can be suppressed.

Other local data processing schemes may also be practiced within the scope of the present invention, of which several examples are provided now.

Given any grouping of N pixels, the known SRW values, together with the data, lead to N equations in 2N unknowns (the phase and amplitude or the real and imaginary parts of the scattered field at each pixel). Some assumption must be made to reduce the number of unknowns. In the two-line method, there is an assumption that the field at a particular pixel in line 1 is the same as the field in the adjacent pixel in line 2. Thus the number of unknowns is reduced by the necessary factor 2. In the FT method (the classical holographic processing), the bandwidth of the image is cut in half, avoiding a strict equivalence between any two pixels, but globally reducing the number of unknowns again by a factor two. Alternatives will suggest themselves to persons of skill in the art, and are encompassed within the scope of the present invention.

In a further example, sets of four pixels may be grouped, assuming the scattered field to be the same at each pixel. Given the values of the SRW, the data may then be fit to a sinusoid. Such an approach is very local and could be implemented fast as data are collected. It can also be implemented with any SRW as long as the SRW varies enough to produce sufficiently linearly independent data. That is, the SRW need not mimic a plane wave. It is, however, also over-constrained, in that it reduces the number of unknowns by a factor of 4. Thus, this approach fails to make use of some of the available information across pixels, so-called mutual information.

In yet another example, a subset of the data may be treated by the classical FT method. That is, the SRW behaves like a plane-wave over a block of the data and this block of data is treated in the usual way by FT-filter-IFT. This allows for a windowed approach to the problem, taking advantage of the mutual information across the block and allowing for adaptive sampling schemes to treat samples that have patches of high variation and low variation. The disadvantage is that this approach ignores available information across blocks.

Moreover, as in the single-frequency case, the N-pixel data problem can be thought of in a more general setting as a problem of solving for the 2N unknowns that represent the scattered field, with M discrete frequencies, and, without spectrally-resolved detection, this becomes 2MN unknowns from N data. For instance, with two discrete frequencies and sufficient variation in the SRW, the complex scattered field at each frequency may be determined from data at four pixels by assuming the scattered field is the same at all four pixels and then fitting the data to two sinusoids.

In the case of spectrally-resolved detection, the data consist if N pixels at M frequencies and the result data set of MN data must be used to found the 2MN unknown values of the scattered field. As described above, this can be accomplished with the usual FT-filter-IFT approach but now in one dimension higher. Just as in the single frequency case, the key point is an assumption that reduced the unknowns by at least a factor of two. This can also be done by taking patches of the data as described above for the single-frequency case.

Methods for Leveraging Reference Arm Motion

Figure 11A:
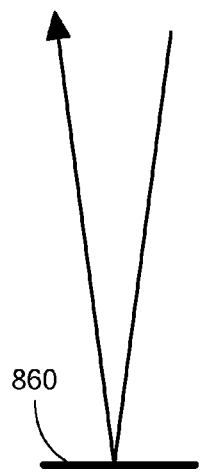
Figure 11B:
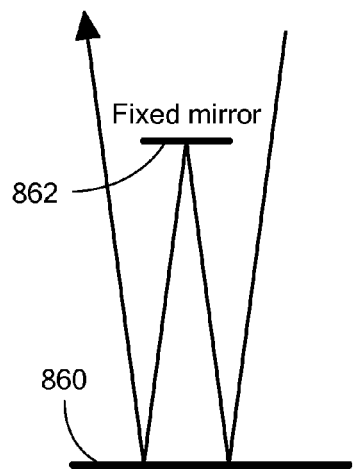
FIG. 11B and FIG. 11C show 2- and 4-fold leveraging of reference arm length modulation by folding the reference beam with the reference arm, relative to FIG. 11A, in accordance with embodiments of the present invention.
Figure 11C:
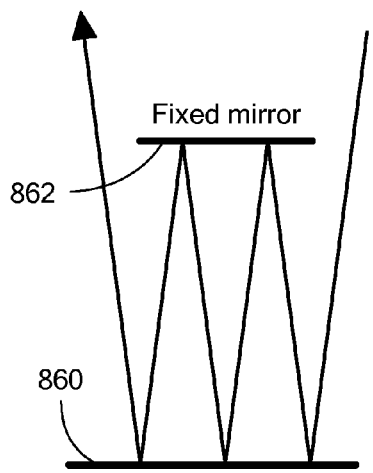

Among alternate embodiments of the present invention, many of which will be evident and matters of design choice to skilled artisans, methods of generating fast or long-running reference arm stages are now described with reference to FIGS. 11A-11C.

Typical piezo stages have a travel range of between several 100s of micrometers to a few millimeters. Particularly for longer wavelengths such as infrared light and THz light, these ranges fall a bit short for generating large k-vectors or for recording holograms with 1000s of lines. This situation is worse if frequency-multiplexing without wrapping, as described herein, is applied. Consequently, it is advantageous to amplify the motion of a single piezo stage-mounted mirror 860 in its effect on the phase by having the beam 861 make multiple passes between mirrors, one a fixed mirror 862, and another piezo-mounted 860. For instance, by coming in obliquely and using multiple bounces between two mirrors we could achieve an N-fold amplification of the piezo movement, N−1 being the number of reflections from the added mirror. FIGS. 11A, 11B, and 11C show 1-, 2- and 4-fold increases in the phase modulating effect of motion of piezo-mounted mirror 860.

Figure 11D:
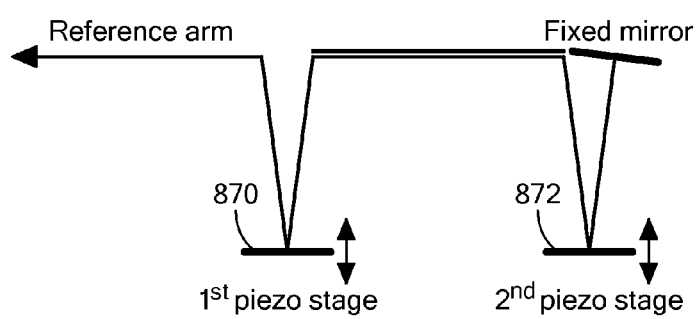
Figure 11E:
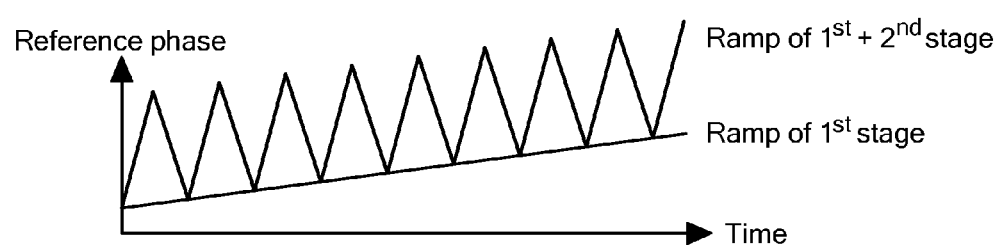
FIG. 11E is a plot of a resultant phase function.

Additionally, as described with reference to FIG. 11D, multiple piezo stages may be employed, within the scope of the present invention. In particular, the use of two piezo stages is preferred so that both large $k_y$ and large $k_x$ vectors can be generated. A first piezo stage 870 (preferably, with a large travel range) scans a linear ramp. As described in the section of this description dealing with phase wrapping, the $k_y$ vector is generated and, optionally, also phase wrapping. A second piezo stage 872 (preferably, with medium travel range and quick response) scans a linear ramp in synchronization with the probe stepping. When the recording of a new line starts, the second piezo stage starts the scan of a linear ramp. The linear ramp is scanned while the line is recorded. This generates a $k_x$ vector. The resultant reference phase 874 is plotted vs. time in FIG. 11D. It should be noted that the first piezo stage-mounted mirror 860 need not be synchronized with stepping the local probe 222 or illuminating beam 205, and, moreover, that the function of the two piezo stages 870 and 872 can be achieved with a suitably driven single stage.

Various SOH Phase and Amplitude Modulation Modalities

As has been pointed out above, "modulation," as the term is used herein, while generally described in the context of varying the relative phase between a field scattered by a sample and a reference beam is not so limited, within the scope of the present invention, and is merely described in those terms for convenience of description and heuristic purposes. A variety of means for controlling, and, thus, modulating, the relative amplitude and phase of the reference beam relative to the scattered beam are now described by way of example, and without limitation.

Devices based on reflection:
Mirrors/reflective surfaces mounted on tiltable/movable stages, for example on piezo stages.
Digital micro-mirror device (DMD) chip, as used, for example, in digital light projectors. Micrometer-sized mirrors can be tilted/translated at high-speed thus allowing for high-speed modulation
Metasurfaces using optical resonators or other means to generate a spatial varying phase response of the surface, as described, for example, by Yu et al., *Light Propagation with Phase Discontinuities: Generalized Laws of Reflection and Refraction, Science*, vol. 334, pp. 333-37 (2011), incorporated herein by reference. Moving or tilting such a metasurface may be used for modulating the amplitude and/or phase of the reference beam within the scope of the present invention.

Devices based on refraction:
Rotating/translating disk of dielectric with changing thickness. As disk is moved, the light beam traverses a thinner/thicker part of the disk, thus experiencing a phase-shift with respect to the other interferometer arm.
Electronic control
Spatial Light Modulator (SLM) such as LCDs for a modulation of amplitude, phase and polarization.
Liquid crystal (LC) such as nematic LCs will experience a change in the refractive index when a voltage is applied, thus yielding a phase shift
Acousto-optic modulator (AOM) to modulate the deflection, intensity, frequency, phase and/or polarization of the reference arm; uses the acousto-optic effect to diffract and shift the frequency of light using sound waves.
Scanning
Moving the sample up or down in direction of the illuminating beam or in the direction of the detection of the scattered field.
Intrinsic phase modulation of the scanning process in a confocal microscope. Rather than scanning the sample, the beam is scanned by, e.g., deflection galvanometer scanners. In this case, the path length is depends on the current deflection setting. By x,y scanning the beam across the sample, thus a phase function is generated.

While the foregoing methods of modulation may be deliberately employed for the generation of phase functions, a phase modulation by some of these methods could occur without intention, thus producing unwanted phase shifts in the reconstructed images. Such contributions may be corrected for, by, for example, (a) calibration measurements or (b) by taking into account the actual geometry and other factors of the setup to create a correction function. The foregoing discussion applies to amplitude modulation and to any other modulation as well.

Correction of Errors in the Modulation of the Reference Arm

As is clear from the description above, phase modulation and other modulation techniques of the reference arm are a fundamental part of SOH. Any errors introduced in the modulation may degrade the performance of SOH, consequently, care must be taken to compensate for errors introduced during the course of phase modulation. Where a piezo stage 870 (shown, for example, in FIG. 11C) is used for phase modulation, the piezo stage is typically driven in close-loop, where a piezo controller (not shown) compares the measured position of the piezo stage with the desired setup and attempts to reduce the difference between both (=error) to a minimum. This has important implication when increasing the speed of SOH, as this requires fast scanning of the piezo stage. At high speeds, the controller typically cannot compensate entirely the error. Moreover, a non-zero error (bias) may remain even in the static case.

In accordance with embodiments of the present invention, an error in piezo stage response may be taken into account by recording also the measured position of the piezo stage simultaneously with the detector signal. Comparing with the SRW matrix (=setpoint), a correction to the reconstructed amplitude and phase image may be applied by interpolating or "resampling" the acquired data onto the desired grid, which is linear in linear in piezo position. Similarly, a pre-characterization of the modulation device may be performed yielding a set of data that can be used for correction. In this case, even modulators without direct read-out option can be corrected. Similar corrections may be applied in cases of other phase modulators, as would be completely obvious to persons of ordinary skill in instrumentation design.

Configuration for Implementing SOH in Confocal Microscopy

Figure 12:
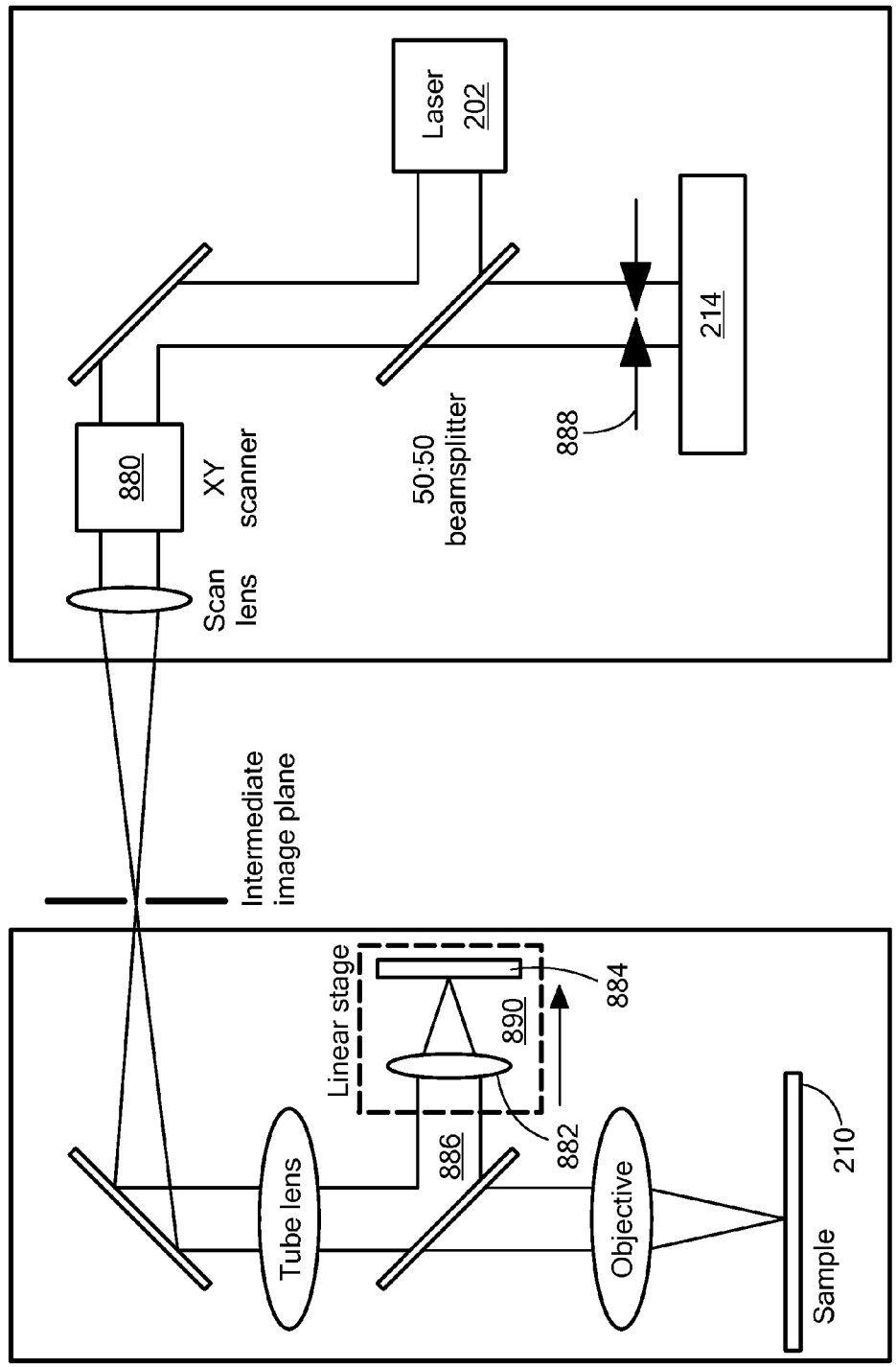
FIG. 12 depicts an arrangement for implementing SOH techniques in a confocal microscope, in accordance with an embodiment of the present invention.

An embodiment of the present invention is now described with reference to FIG. 12, allowing for the implementation of SOH techniques described herein in confocal microscopes where galvo beam scanners 880 are employed. By placing a lens 882 in front of reference mirror 884, light 886 is reflected back in the same angle. Thus, the reference beam passes through pin hole 888 in front of detector 214 at any angle of the beam scanners 880 (i.e., the reference beam is properly descanned). Without the lens 882, a proper descanning is not possible. Alternatively, the mirror 884 may be replaced by a retroreflector or any other kind of optical component that reflects light back to its source. In this case, a lens is not necessary.

Lens 882 and mirror 884 are mounted on a linear piezo stage 890 and moved together to generate a phase function.

Exemplary Applications of SOH Techniques

Several applications are now listed, without limitation, in which SOH techniques, as described herein in accordance with the present invention, may advantageously be applied.

Infrared Holography, where Phase Contrast in Reflection or Scattering Yields a Measure of Absorption:

It has recently been demonstrated that the phase in a SNOM experiment may be related to the local absorption. Using sources emitting a plurality of wavelengths, swept-sources or broadband sources, complex-valued spectra from the sample may be obtained. The complex-valued spectra not only contain the reflection coefficient, as it would be obtained from a non-interferometric measurement, but also the absorption of the sample. More details on this application may be found in Huth et al., *Infrfared-Spectroscopic Nanoimaging with a Thermal Source, Nature Materials*, vol. 10, pp. 352-56 (2011), which is incorporated herein by reference.

Printing Holograms Acquired with SOH:

By appropriately scaling the raw hologram from a one-frequency experiment and printing the result using a printer, holograms measured with SOH may be turned into classical viewable holograms. Additionally, raw holograms from experiments involving a plurality of frequencies may be recorded by a processor and turned into classical viewable color holograms by means of a printer. It is, moreover, possible to process SOH holograms, magnifying imaged structures to visible scales.

THz Holography in Microscopy and Scanning Systems:

SOH can also be applied to THz frequencies because the key element of SOH is the reflection of light from a mirror which works from visible to THz frequencies, and even x-ray mirrors and radar mirrors are possible. Imaging is difficult in the THz region of the spectrum because camera technology is lacking. This makes the SOH concept attractive for THz because only a one-pixel detector is needed. SOH with THz radiation may enable holographic microscopy at THz, yielding amplitude and phase maps of the sample. Moreover, a 3D THz scanner using SOH techniques may be used in security. A depth range of a few meter can be expected for THz. This makes THz radiations particularly attractive for 3D scanner of large objects such as humans, cars etc.

Rapid SNOM and Megapixel SNOM:

In SNOM, amplitude- and phase-resolved measurement of the light that is scattered or collected by tip 222 (shown, for example, in FIG. 2B) is usually performed with interferometric methods. Among these are homodyne, heterodyne, pseudoheterodyne and phase-shifting. SOH can replace these interferometric methods, thus yielding amplitude- and phase-resolved near-field imaging. The advantage is a gain in speed and simplicity. With SOH, extremely short integration times are possible, enabling pixel rates well above 1 kHz. In comparison to interferometric methods, a factor of >10 in speed can be expected.

The ability to record more than 1000 pixels per second enables applications such as the acquisition of megapixel near-field images with SNOM in times on the order of minutes or hours. This is useful for screening applications in biomedicine, graphene production, semiconductor fabrication, etc.

A further application is rapid SNOM where a kilopixel near-field image can be recorded in a time frame on the order of seconds. Acquiring a series of near-field images allows the visualization of dynamic processes.

Megapixel SNOM and rapid SNOM are limited by the scanning speed of the underlying AFM. The combination of SOH with fast AFM techniques may lead to video-rate phase-resolved SNOM.

Embodiments of the present invention may advantageously be considered as interferometric amplification of scatter signals, potentially by several orders of magnitude, thereby advantageously providing for the measurement and imaging, with substantial signal-to-noise, of weak signals. Thus, advantage may be provided even with respect to intensity images (squaring amplitude images) with respect to non-holographic modalities.

In preferred embodiments of the present invention, certain disclosed methods for nanoholographic imaging may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

The embodiments of the invention described above are intended to be merely exemplary; numerous variations and modifications will be apparent to those skilled in the art. For example, the function of a scanning near-field probe may be served by a nanoparticle inserted into the sample and driven, for instance by a magnetic field, or allowed to drift by Brownian motion or some other diffusive process. An appropriately fast-rising phase ramp of the reference may then be used with assumptions about the particle path to a 1-D hologram of the field scattered by the particle-sample system as the particle moves.

While described herein in the context of photons, techniques described herein may be applied to plasmons, phonons, surface waves, surface polaritons and massive particles, the latter, for example, as in scanning electron microscopy, all without departure from the scope of the present invention. The illuminating beam or reference beam may propagate as a free-space-propagating beam or as a guided beam. These and all other such variations and modifications are intended to be within the scope of the present invention as defined in any appended claims.

What is claimed is:

1. A method for imaging at least one of a phase and an amplitude characterizing a scattered field emanating from a sample, the method comprising:
   a. sequentially scanning a parameter characterizing the sample to a plurality of successive loci of a hologram dimension;
   b. illuminating the sample with a focusing illuminating beam;
   c. imposing a specified phase function on a reference beam relative to the illuminating beam;
   d. superimposing with the reference beam a field associated with the scattered field;
   e. detecting the superimposed reference beam and field associated with the scattered field for each locus to produce a detected signal;
   f. recording the detected signal as a function of locus in order to obtain a hologram; and
   g. processing the hologram to generate an image of at least one of phase and amplitude associated with the scattered field.

2. The method in accordance with claim 1, wherein processing the hologram comprises:
   i. transforming the hologram into a transform space;
   ii. filtering the transform to isolate a single crossterm; and
   iii. retransforming the single crossterm to generate an image of at least one of phase and amplitude associated with the scattered field.

3. The method according to claim 2, wherein the single crossterm is one of a direct term and a conjugate term in a Fourier transform of the holograms.

4. The method in accordance with claim 1, wherein sequentially scanning a parameter includes sequentially scanning a position in physical space.

5. The method in accordance with claim 4, wherein the illuminating beam includes a beam of photons in at least one of the infrared, terahertz, visible, ultraviolet, and x-ray portions of the electromagnetic spectrum.

6. The method according to claim 5, further comprising specifying a reference beam phase function in such a manner as to position crossterms associated with distinct frequencies in specified positions in the transform space.

7. The method in accordance with claim 4, wherein sequentially scanning a position includes sequentially scanning a probe position relative to the sample.

8. The method in accordance with claim 7, wherein the probe is a local probe.

9. The method in accordance with claim 7, wherein the probe is a near-field probe.

10. The method according to claim 7, wherein sequentially stepping a local probe to a plurality of successive probe positions includes stepping the local probe to a plurality of successive probe positions in three dimensions.

11. The method according to claim 10, wherein stepping in a third dimension is accomplished by vibration of the local tip at a fundamental frequency.

12. The method according to claim 11, further comprising simultaneously demodulating the detector signals at harmonics of the fundamental frequency.

13. The method in accordance with claim 4, wherein sequentially scanning a position includes stepping an illuminating beam to a plurality of positions at successive fields of view, each field of view encompassing a portion of the sample.

14. The method according to claim 13, wherein sequentially stepping the illuminating beam to a plurality of successive fields of view includes scanning confocal microscopy.

15. The method according to claim 13, wherein sequentially stepping the illuminating beam to a plurality of successive fields of view includes stepping the illuminating beam to a plurality of successive fields of view in three dimensions.

16. The method in accordance with claim 1, wherein the illuminating beam includes a beam of photons.

17. The method in accordance with claim 1, wherein at least one of the illuminating beam and the reference beam is quasi-monchromatic.

18. The method according to claim 1, wherein a plurality of illuminating or reference beams are distinguished in the step of detecting.

19. The method according to claim 1, wherein superimposing with the reference beam a field associated with the scattered field includes superimposing a plurality of reference beams that traverse distinct reference paths.

20. The method according to claim 1, wherein the scattered field is characterized by a wavelength substantially equal to a wavelength characterizing the illuminating beam.

21. The method according to claim 1, wherein the scattered field is characterized by a wavelength that is distinct from any wavelength characterizing the illuminating beam.

22. The method according to claim 1, wherein at least one of the illuminating and reference beams is one of the group including a beam of photons, plasmons, phonons, surface waves, surface polaritons and massive particles.

23. The method according to claim 1, wherein at least one of the illuminating and reference beams propagates in free space.

24. The method according to claim 1, wherein at least one of the illuminating and reference beams is a guided wave.

25. The method according to claim 1, wherein sequentially stepping the local probe to a plurality of successive probe positions includes motion of a nanoparticle within the medium.

26. The method according to claim 25, wherein motion of a nanoparticle within the medium includes motion induced by at least one of an electric field, a magnetic field, and optical tweezers.

27. The method in accordance with claim 1, wherein at least one of the illuminating beam and the reference beam includes a plurality of wavelengths.

28. The method in accordance with claim 27, wherein at least one of the illuminating beam and the reference beam includes a plurality of distinct wavelengths.

29. The method according to claim 27, further comprising:
   a. wavelength-resolving the superimposed reference beam and field associated with the scattered field for each locus to produce a plurality of detector signals; and
   b. applying steps (f)-(g) of claim 1 to each of the plurality of detector signals.

30. The method according to claim 29, wherein the step of wavelength-resolving the superimposed reference beam and field associated with the scattered field for each locus is performed by means of a grating.

31. The method in accordance with claim 1, further comprising scanning a frequency characterizing the illuminating beam.

32. The method according to claim 31, further comprising:
   a. demultiplexing the superimposed reference beam and field associated with the scattered field for each locus to produce a plurality of wavelength-resolved detector signals; and
   b. applying steps (f)-(g) of claim 1 to each of the plurality of wavelength-resolved detector signals.

33. A method in accordance with claim 1, wherein sequentially scanning a parameter includes sequentially scanning at least one physical parameter applied to a portion of the sample.

34. The method in accordance with claim 33, wherein the at least one physical parameter includes at least one of voltage, temperature, and magnetic field.

35. The method in accordance with claim 1, wherein sequentially scanning a parameter includes monitoring a dynamic process or movement on the sample.

36. The method according to claim 1, wherein imposing a specified phase function on a reference beam relative to the illuminating beam includes modulating a phase characterizing the reference beam.

37. The method according to claim 1, where imposing a specific function on the reference beam includes phase modulating the reference field by reflection from a movable mirror.

38. The method according to claim 1, further comprising:
   generating the reference beam from the illuminating beam by partial reflection at a beamsplitter chosen from the group of a dielectric surface, a thin metal film, and a profiled mirror.

39. The method according to claim 1, further comprising collecting the scattered field with a light-concentrating element.

40. The method according to claim 1, wherein detecting the superimposed reference beam and field associated with the scattered field includes detection by means of a photodetector.

41. The method according to claim 1, wherein imposing a specified phase function on a reference beam relative to the illuminating beam includes incrementing a phase characterizing the reference beam as a linear function of time.

42. The method according to claim 1, wherein imposing a specified phase function on the reference beam relative to the illuminating beam includes wrapping phase modulo $2\pi$.

43. The method according to claim 1, wherein imposing a specified phase function on the reference beam relative to the illuminating beam includes nonlinear reference phase functions.

44. The method according to claim 1, wherein imposing a specified phase function on the reference beam relative to the sample beam includes feedback from topography of the physical medium.

45. The method according to claim 1, wherein imposing a specified phase function on the reference beam relative to the illuminating beam is tailored to identify defects in manufactured samples.

46. The method according to claim 1, further comprising successive imaging to provide dynamic imaging of a developing sample.

47. An apparatus for imaging at least one of a phase and an amplitude characterizing a scattered field emanating from a sample, the apparatus comprising:
   a. a scanner, selected from the group consisting of a mechanical scanner, a temperature scanner and a magnetic field scanner, for sequentially scanning a parameter characterizing the sample to a plurality of successive loci of a hologram dimension;
   b. a source for generating an illuminating beam;
   c. a phase modulator for imposing a specified phase function on a reference beam relative to the illuminating beam;
   d. a detector for detecting the reference beam and a field associated with the scattered field to generate a detector signal; and
   e. a processor for processing the detected signal to generate an image of at least one of phase and amplitude associated with the scattered field.

48. The apparatus according to claim 47, wherein the scanner is a scanning local probe.

49. The apparatus according to claim 48, wherein the scanning local probe is a cantilevered tip of an atomic force microscope.

50. The apparatus according to claim 47, wherein the scanner is a near-field probe.

51. The apparatus according to claim 47, wherein the phase modulator is a translating mirror.

52. The apparatus according to claim 47, wherein the source emits multiple discrete wavelengths.

53. The apparatus according to claim 47, wherein the source may be swept in wavelength.

54. The apparatus according to claim 47, further comprising a dispersive element for resolving wavelength components prior to detection.

55. The apparatus according to claim 47, further comprising a demultiplexer for separating components of the detector signal.

56. A method for recording a hologram, the method comprising:
   a. sequentially scanning a parameter characterizing the sample to a plurality of successive loci of a hologram dimension;
   b. illuminating the sample with a focusing illuminating beam;
   c. imposing a specified phase function on a reference beam relative to the illuminating beam;
   d. superimposing with the reference beam a field associated with the scattered field;
   e. detecting the superimposed reference beam and field associated with the scattered field for each locus to produce a detected signal; and
   f. recording the detected signal as a function of locus in order to obtain a hologram.

57. A method in accordance with claim 56, further comprising rendering the hologram as a classical viewable hologram.

58. An apparatus for recording a hologram, the apparatus comprising:
   a. a scanner, selected from the group consisting of a mechanical scanner, a temperature scanner and a magnetic field scanner, for sequentially scanning a parameter characterizing the sample to a plurality of successive loci of a hologram dimension;
   b. a source for generating an illuminating beam;
   c. a phase modulator for imposing a specified phase function on a reference beam relative to the illuminating beam;
   d. a detector for detecting the reference beam and a field associated with the scattered field to generate a detector signal; and e. a processor adapted for recording the detected signal as a function of locus thereby generating a hologram.

\* \* \* \* \*